(12) United States Patent
Koyama et al.

(10) Patent No.: US 8,588,379 B2
(45) Date of Patent: Nov. 19, 2013

(54) MULTIMEDIA COMMUNICATION SYSTEM, MULTIMEDIA COMMUNICATION DEVICE AND TERMINAL

(75) Inventors: Kazuhiro Koyama, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 917 days.

(21) Appl. No.: 12/669,678

(22) PCT Filed: Jun. 19, 2008

(86) PCT No.: PCT/JP2008/061229
§ 371 (c)(1),
(2), (4) Date: Jan. 19, 2010

(87) PCT Pub. No.: WO2009/013959
PCT Pub. Date: Jan. 29, 2009

(65) Prior Publication Data
US 2010/0189233 A1    Jul. 29, 2010

(30) Foreign Application Priority Data
Jul. 26, 2007    (JP) .................................. 2007-194407

(51) Int. Cl.
*H04M 1/64*    (2006.01)
(52) U.S. Cl.
USPC .................. 379/88.22; 379/88.23; 379/88.25

(58) Field of Classification Search
USPC .......... 379/88.22, 76, 79, 88.27, 88.23, 88.25
See application file for complete search history.

(56) References Cited

FOREIGN PATENT DOCUMENTS

| JP | 09-247276 A | | 9/1997 |
|---|---|---|---|
| JP | 09247276 A | * | 9/1997 |
| JP | 2001-257811 A | | 9/2001 |
| JP | 2001257811 A | * | 9/2001 |
| JP | 2002-112264 A | | 4/2002 |
| JP | 2004-282405 A | | 10/2004 |
| JP | 2005-033442 A | | 2/2005 |
| JP | 2005-079882 A | | 3/2005 |
| JP | 2005-223403 A | | 8/2005 |
| JP | 2005-348073 A | | 12/2005 |
| JP | 2006-033743 A | | 2/2006 |
| JP | 2006-109095 A | | 4/2006 |
| JP | 2007-074744 A | | 3/2007 |

OTHER PUBLICATIONS

International Search Report for PCT/JP2008/061229 mailed Sep. 22, 2008.

* cited by examiner

*Primary Examiner* — Gerald Gauthier
*Assistant Examiner* — Simon King

(57) ABSTRACT

At one of the timings: during a period between the moment when one of terminals which performs transmission calls out a communication partner and the moment of response and at the timing after the communication between the terminals is complete; content data is read out from a database and the read out content data is transmitted to the terminal.

9 Claims, 29 Drawing Sheets

| identification number | classification | content | reproduction environment information |
|---|---|---|---|
| 0001 | image data (moving picture) | | A |
| 0002 | image data (still picture) | | B |
| 0003 | image data (moving picture) | | C |
| 0004 | speech data | "Telephone!" | D |
| ⋮ | ⋮ | ⋮ | ⋮ |

Fig. 7

| terminal identification number | encoding method | encoding bit rate | frame rate | image size | profile | level | encoding option | encoding frame type composition | video packet size | intraframe spacing | intra-macroblock number | quantization value |
|---|---|---|---|---|---|---|---|---|---|---|---|---|
| 102-1 | | | | | | | | | | | | |
| 102-2 | | | | | | | | | | | | |
| ... | ... | ... | ... | ... | ... | ... | ... | ... | ... | ... | ... | ... |
| 102-n | | | | | | | | | | | | |

| identification number | character string |
|---|---|
| 1001 | Good Morning |
| 1002 | How are you? |
| 1003 | I' ve been accepted to a college! |
| ⋮ | ⋮ |

| identification number | classification | advertisement data |
|---|---|---|
| 9001 | advertisement character data | ○○Electronics |
| 9002 | advertisement character data | △△Shopping |
| 9003 | advertisement image | 40-inch liquid crystal TV: ¥150,000! |
| 9004 | advertisement image | Day trip to hot spring: ¥5,000! |
| ⋮ | ⋮ | ⋮ |

| number of transmissions | preferential treatment information |
|---|---|
| 1-5 | ¥100 reduction of call charges |
| 6-10 | ¥500 reduction of call charges |
| . | . |
| . | . |
| . | . |

| transmission time | preferential treatment information |
|---|---|
| 1-3 minutes | call charges for one day cancelled |
| 3-10 minutes | call charges for two days cancelled |
| . | . |
| . | . |
| . | . |

MULTIMEDIA COMMUNICATION SYSTEM, MULTIMEDIA COMMUNICATION DEVICE AND TERMINAL

This application is the National Phase of PCT/JP2008/061229 filed Jun. 19, 2008 which claims priority that is based on Japanese Patent Application 2007-194407 submitted Jul. 26, 2007 and incorporates all of the disclosures of that application.

TECHNICAL FIELD

The present invention relates to a multimedia communication system for carrying out multimedia communication, and to a multimedia communication device and terminal.

BACKGROUND ART

The wider bandwidth of IP networks in recent years has been accompanied by the popularization of videophone terminals that carry out multimedia communication of both speech and images. Multimedia communication takes advantage of the properties of "images" that did not exist in conventional voice communication to not only allow conversation in which partners can see each other but also to meet a wide variety of other service needs.

However, when an originator terminal is calling a termination-side terminal (before the terminator terminal responds), images, i.e., desired content, were not displayed on the originator terminal or on the terminator terminal.

In addition, during a call between terminals, desired character strings were not inserted into images displayed on the originator terminal or on terminator terminal.

However, techniques have been considered by which, in a call between videophone terminals, when the originator terminal is calling the termination-side terminal (before the termination-side terminal responds), prescribed data are transmitted to the originator terminal, and the transmitted data are displayed on the originator terminal (for example, see JP-A-2005-033442).

However, nothing is described in the above-described patent documents regarding information for reproducing the data in the originator terminal.

DISCLOSURE OF THE INVENTION

It is an object of the present invention to provide a multimedia communication system, a multimedia communication device and a terminal that enable the reproduction of desired data in a terminal at a prescribed timing and in a form appropriate to the data in order to solve the above-described problems.

The present invention for achieving the above-described object is a multimedia communication device that is connected to a plurality of terminals and that processes call process signals of the plurality of terminals, comprising:

a database in which content data are stored in advance; wherein the multimedia communication device:

reads the content data from the database at either the timings of:

(a) the interval from the time a call is made by a terminal, that performs call origination among the plurality of terminals, to a terminal among the plurality of terminals that is the communication partner of the terminal that performs call origination, until the terminal responds; or (b) after completion of conversation between the terminals; and transmits the content data that were read to the terminals.

Further, the present invention is a multimedia communication device that is connected to a plurality of terminals and that processes call process signals of the plurality of terminals; comprising:

a database in which character strings that can be displayed on the plurality of terminals are stored in advance;

wherein the multimedia communication device:

after a terminal that is the communication partner of the terminal that performs call origination among the plurality of terminals responds, reads the character string from the database;

inserts the character string that was read into image data that are transmitted and received between the terminal that performs call origination and a terminal that is the communication partner of the terminal that performs call origination; and transmits the image data into which the character string was inserted to the terminals.

Further, the present invention is a multimedia communication device that is connected to a plurality of terminals and that processes call process signals of the plurality of terminals; comprising:

a database in which content data are stored in advance;

wherein the multimedia communication device:

reads the content data from the database in accordance with either:

(a) a read signal transmitted from an origination-side terminal that is the terminal that performs call origination among the plurality of terminals; and (b) a read signal transmitted from a termination-side terminal that is a terminal that is the communication partner of the origination-side terminal among the plurality of terminals; and transmits the content data that were read to at least one terminal from among the origination-side terminal and the termination-side terminal.

Further, the present invention is a multimedia communication device that is connected to a plurality of terminals and that processes call process signals of the plurality of terminals; comprising:

a database in which character strings that can be displayed on the plurality of terminals are stored in advance;

wherein the multimedia communication device:

reads the character string from the database in accordance with either:

(a) a read signal transmitted from an origination-side terminal that is the terminal that performs call origination among the plurality of terminals; or (b) a read signal transmitted from a termination-side terminal that is the terminal that is the communication partner of the origination-side terminal among the plurality of terminals; and inserts the character string that was read into image data that are transmitted and received between the origination-side terminal and the termination-side terminal; and transmits the image data into which the character string was inserted to the terminals.

Further, the present invention is a terminal that is connected to a multimedia communication device for transmitting content data, wherein the terminal reproduces content data that were transmitted from the multimedia communication device at either the timings of:

(a) during the time when a call is made from that terminal to another terminal, or (b) after completion of a conversation between that terminal and another terminal.

Further, in a multimedia communication system made up from a plurality of terminals and a multimedia communication device, the multimedia communication device being connected to the plurality of terminals and processing call process signals of the plurality of terminals, wherein the multimedia communication device includes a database in which content data are stored in advance and reads the content data from the database at either the timings of:
  (a) the interval from the time a call is made by a terminal, that performs call origination among the plurality of terminals, to a terminal among the plurality of terminals that is the communication partner of the terminal that performs call origination, until the terminal responds; or
  (b) after conversation between the terminals is completed; and
transmits the content data that were read to the terminals; and
the terminals reproduce content data that are transmitted from the multimedia communication device.

In the present invention as described hereinabove, a configuration is adopted in a system for transmitting and receiving images and speech in which content data and character strings that are stored in advance in a database are transmitted to a terminal at a prescribed timing, whereby desired content data or image data into which character strings have been inserted can be reproduced in the terminal at a prescribed timing and in a format appropriate to the content data or image data into which character strings have been inserted.

BRIEF DESCRIPTION OF THE DRAWINGS

FIG. 7 shows one construction of the conversion information database shown in FIG. 2;

EXEMPLARY EMBODIMENT

Explanation next regards embodiments of the present invention with reference to the accompanying figures.

Figure 1:
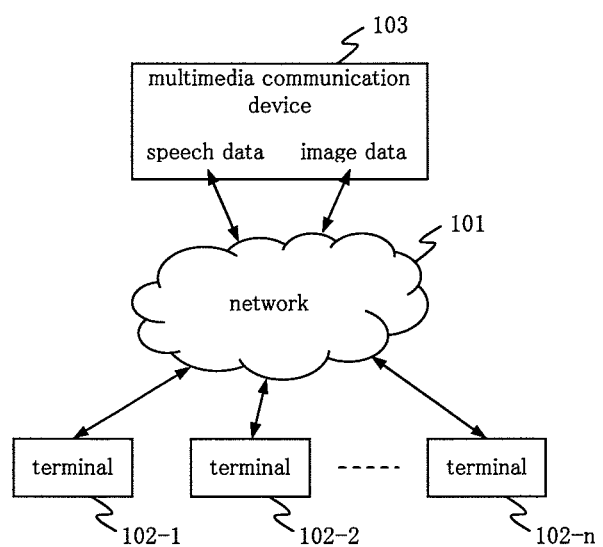
FIG. 1 shows an embodiment of the multimedia communication system of the present invention.

FIG. 1 shows one embodiment of the multimedia communication system of the present invention.

As shown in FIG. 1, in the present embodiment, a plurality of terminals 102-1-102-n and multimedia communication device 103 are connected by way of network 101.

Terminals 102-1-102-n are communication terminals that can be represented by videophone terminals that can transmit and receive images and speech. Terminals 102-1-102-n can each originate calls and terminate calls. Terminals 102-1-102-n each encode, as speech data, speech that is collected by a speech collection means such as a microphone provided on each of terminals 102-1-102-n and transmit the encoded speech data. Terminals 102-1-102-n further each encode, as image data, images that are captured by a capture means such as a camera provided on each of terminals 102-1-102-n and transmit the encoded image data. Terminals 102-1-102-n further decode speech from the received speech data and reproduce the decoded speech by means of a speech reproduction means such as a speaker that is provided on each of terminals 102-1-102-n. Terminals 102-1-102-n further decode images from received image data and reproduce the decoded images by means of an image reproduction means such as a display provided on each of terminals 102-1-102-n.

Multimedia communication device 103 intermediates the transfer of speech data and image data that are transmitted and received between terminals 102-1-102-n by way of network 101. Multimedia communication device 103 additionally has the role of server for transmitting any content or character string to terminals 102-1-102-n.

First Embodiment

Explanation first regards the first embodiment of multimedia communication device 103 shown in FIG. 1.

Figure 2:
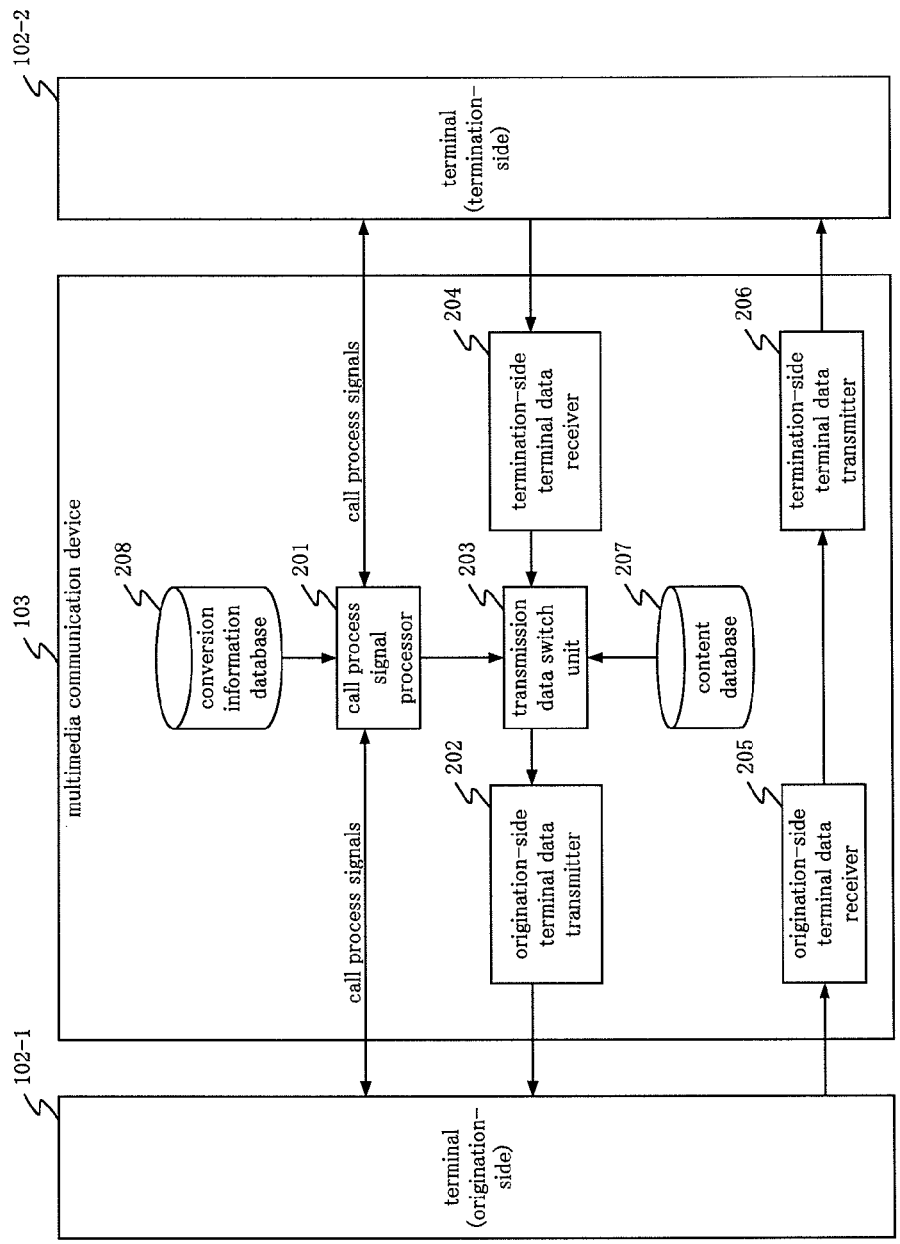
FIG. 2 shows the first embodiment of the multimedia communication device shown in FIG. 1.

FIG. 2 shows the first embodiment of multimedia communication device 103 shown in FIG. 1. An example is here shown in which communication is carried out between terminals 102-1 and 102-2. In this case, terminal 102-1 is the origination-side terminal and terminal 102-2 is the termination-side terminal that is the communication partner of terminal 102-1. In addition, the operations of terminals 102-3-102-n are identical to the operations shown below regardless of which among terminals 102-3-102-n is the origination-side terminal or termination-side terminal.

As shown in FIG. 2, the first embodiment of multimedia communication device 103 shown in FIG. 1 is made up from: call process signal processor 201, origination-side terminal data transmitter 202, transmission data switch unit 203, termination-side terminal data receiver 204, origination-side terminal data receiver 205, termination-side terminal data transmitter 206, and content database 207.

Call process signal processor 201 transmits and receives call process signals between terminal 102-1 and terminal 102-2. In addition, the reproduction environment information (information that indicates the environment in which content data reproduced) of encoded data that are transmitted and received between terminal 102-1 and terminal 102-2 is also transmitted and received between terminal 102-1 and terminal 102-2. In this case, the reproduction environment information of encoded data is information necessary for reproducing the encoded data on terminals 102-1 and 102-2, and may be, for example, information for receiving the encoded data (the address, port, format, application for reproduction, etc.) or a bandwidth value used in the encoded data. A protocol such as SDP (Session Description Protocol: RFC2327) of the IETF standards may be used in the transmission and reception of this reproduction environment information. In addition, call process signal processor 201 issues instructions to transmission data switch unit 203 to read content from content database 207 at a prescribed time or at the timing of reception of call process signals from terminal 102-1 or terminal 102-2. Call process signal processor 201 further issues instructions to transmission data switch unit 203 to transmit content that has been read from content database 207 to terminal 102-1 at a prescribed time or at the timing of reception of call process signals from terminal 102-1 or terminal 102-2. Alternatively, call process signal processor 201 issues instructions to transmission data switch unit 203 to transmit encoded data that have been transmitted from terminal 102-2 and received in multimedia communication device 103 to terminal 102-1 at a prescribed time or at the timing of reception of call process signals from terminal 102-1 or terminal 102-2. Call process signal processor 201 can use a protocol such as SIP (Session Initiation Protocol: RFC3261) of the IETF standards as the call process signals.

Origination-side terminal data transmitter 202 transmits encoded data supplied from transmission data switch unit 203 to terminal 102-1.

Transmission data switch unit 203 reads content from content database 207 in accordance with instructions from call process signal processor 201 and encodes the content. In addition, in accordance with instructions from call process signal processor 201, transmission data switch unit 203 switches the encoded data supplied to origination-side terminal data transmitter 202 to that of encoded data of content that has been read from content database 207 and then to encoded and encoded data that are supplied from termination-side terminal data receiver 204 (encoded data that are transmitted from terminal 102-2).

Figures 3, 4:
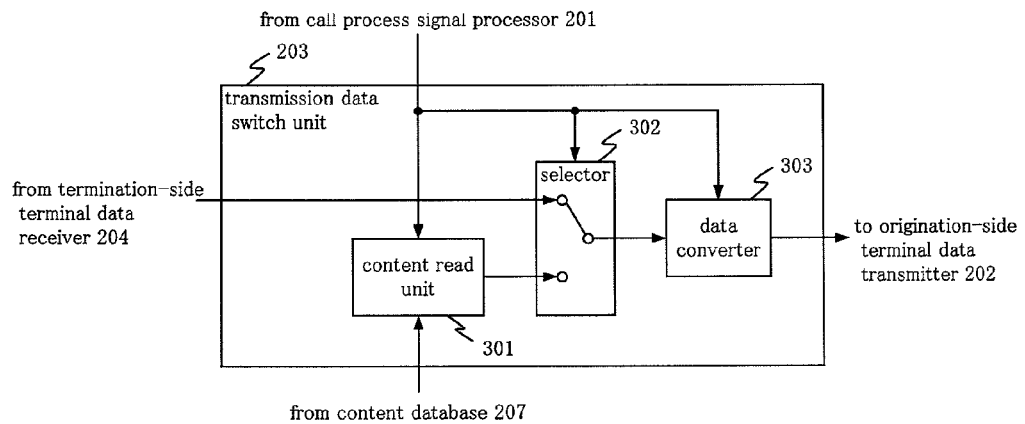
FIG. 3 shows one configuration of the transmission data switch unit shown in FIG. 2.
FIG. 4 shows one construction of the content database shown in FIG. 2.

FIG. 3 shows the configuration of transmission data switch unit 203 shown in FIG. 2.

As shown in FIG. 3, transmission data switch unit 203 shown in FIG. 2 is made up from content read unit 301, selector 302, and data converter 303.

Content read unit 301 reads content from content database 207 and encodes the content that has been read as encoded data when there are instructions from call process signal processor 201 to read content from content database 207.

When instructed from call process signal processor 201 to supply origination-side terminal data transmitter 202 with encoded data that have been supplied from termination-side terminal data receiver 204, selector 302 selects the encoded data that are supplied from termination-side terminal data receiver 204. Alternatively, when instructed to supply origination-side terminal data transmitter 202 with encoded data of content that have been read from content database 207 and encoded, selector 302 selects the encoded data of the content.

Data converter 303 converts encoded data selected in selector 302 to a data format that can be decoded and reproduced in terminal 102-1, which is the origination-side terminal. This conversion is realized by carrying out at least one conversion of the conversion information that is stored in conversion information database 208. The conversion information will be explained later. A configuration that lacks this data converter 303 is also possible.

Termination-side terminal data receiver 204 receives encoded data that are transmitted from terminal 102-2 and supplies the encoded data that have been received to transmission data switch unit 203.

Origination-side terminal data receiver 205 receives the encoded data that are transmitted from terminal 102-1 and supplies the encoded data to termination-side terminal data transmitter 206.

Termination-side terminal data transmitter 206 transmits the encoded data that are supplied from origination-side terminal data receiver 205 to terminal 102-2.

Content database 207 stores in advance content data such as a plurality of items of image data of moving images and still images and speech data. Content database 207 may also store character data as content data.

Conversion information database 208 stores in advance conversion information for converting data that are transmitted from multimedia communication device 103 to data that can be decoded and reproduced on each of terminals 102-1-102-n.

In addition, origination-side terminal data transmitter 202 and termination-side terminal data transmitter 206 can be constructed as RTP (Real-Time Transport Protocol) packet transmitters when network 101 is a packet-switched network.

Termination-side terminal data receiver 204 and origination-side terminal data receiver 205 can be configured as RTP packet receivers when network 101 is a packet-switched network.

FIG. 4 shows one construction of content database 207 shown in FIG. 2.

As shown in FIG. 4, content database 207 shown in FIG. 2 stores image data such as moving images or still images or speech data. Each item of the image data or speech data is stored in correspondence with reproduction environment information, a classification, and an identification number individually conferred to each item of data. For example, content that is a moving picture of a ringing portable telephone is placed in correspondence with identification number "0001," the classification "image data (moving picture)," and reproduction environment information "A." Content that is a still picture of a rising sun on the horizon is placed in correspondence with identification number "0002," the classification "image data (still picture)," and reproduction environment information "B." Content that is a moving picture in which a character that is moving is placed in correspondence with identification number "0003," the classification "image data (moving picture)," and reproduction environment information "C." Content that is the speech "Telephone!" is placed in correspondence with identification number "0004," the classification "speech data," and reproduction environment information "D."

Content database 207 may be connected to the outside of multimedia communication device 103, and as necessary, content may be read by multimedia communication device 103.

Explanation next regards the multimedia communication method in multimedia communication device 103 shown in FIG. 2.

Figure 5:
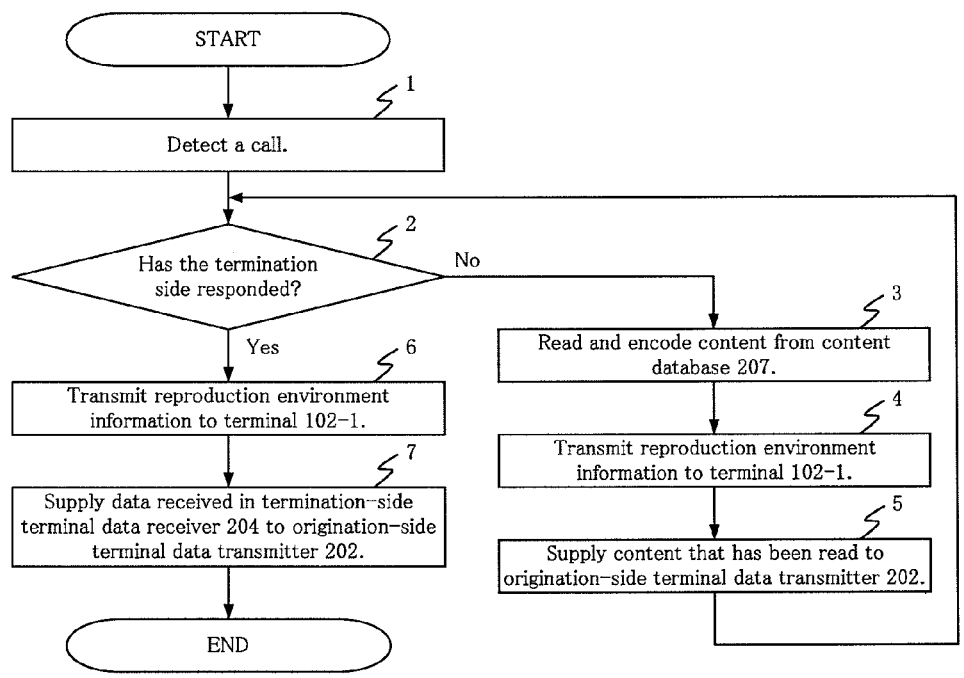
FIG. 5 is a flow chart for explaining the first method of the multimedia communication method in the multimedia communication device shown in FIG. 2.

FIG. 5 is a flow chart for explaining the first method of the multimedia communication method in multimedia communication device 103 shown in FIG. 2.

First, when call origination from terminal 102-1 to terminal 102-2 shown in FIG. 2 is detected in call process signal processor 201 in Step 1, it is determined whether terminal 102-2, which is the termination-side terminal, has responded or not in Step 2.

If it is determined in call process signal processor 201 that terminal 102-2 has not responded, instructions are issued from call process signal processor 201 to transmission data switch unit 203 to read content from content database 207, encode the data, and supply it to origination-side terminal data transmitter 202. In accordance with these instructions, transmission data switch unit 203 reads content from content database 207 and encodes the content in Step 3.

At this time, read content that has been read may be content selected in accordance with the termination-side terminal. In other words, the correspondence between the identification number of content and information for identifying terminals 102-1-102-n may be stored in advance in content database 207, and content is then selected in accordance with this correspondence and read. For example, a case will shown in which information for identifying terminal 102-2 and identification number "0002" are placed in correspondence. At this time, when the termination-side terminal is terminal 102-2, the content having the identification number "0002" may be read. Alternatively, content may be selected and read in accordance with the origination-side terminal. In this case, information for identifying the termination-side terminal and origination-side terminal is supplied from call process signal processor 201 to transmission data switch unit 203. Here, the information for identifying terminals 102-1-102-n may be the telephone numbers of terminals 102-1-102-n, or may be information that can identify terminals 102-1-102-n.

In addition, together with the content, reproduction environment information that is placed in correspondence with this content is read from content database 207, and the reproduction environment information that has been read is supplied from transmission data switch unit 203 to call process signal processor 201. The reproduction environment information that is applied as input to call process signal processor 201 is transmitted from call process signal processor 201 to terminal 102-1 in Step 4.

The encoded data of the content that has been encoded are supplied to origination-side terminal data transmitter 202 in Step 5.

The encoded data of this content are then transmitted from origination-side terminal data transmitter 202 to terminal 102-1.

When it is determined in call process signal processor 201 that terminal 102-2 has responded, the reproduction environment information transmitted in from terminal 102-2 is received in call process signal processor 201 and transmitted from call process signal processor 201 to terminal 102-1 in Step 6. The reproduction environment information transmitted in from terminal 102-2 is reproduction environment information relating to data that are transmitted in from terminal 102-2.

Instructions are issued from call process signal processor 201 to transmission data switch unit 203 to supply encoded data from termination-side terminal data receiver 204 to origination-side terminal data transmitter 202. In accordance with these instructions, in transmission data switch unit 203, encoded data supplied from terminal data receiver 204 are supplied to origination-side terminal data transmitter 202 in Step 7.

The encoded data are then transmitted from origination-side terminal data transmitter 202 to terminal 102-1.

Reproduction environment information relating to data that are transmitted in from terminal 102-2 may be registered in advance in call process signal processor 201. In this case, in Step 4, the reproduction environment information of content may be transmitted to terminal 102-1 and reproduction environment information relating to data that are transmitted in from preregistered terminal 102-2 may further be transmitted to terminal 102-1.

Figure 6:
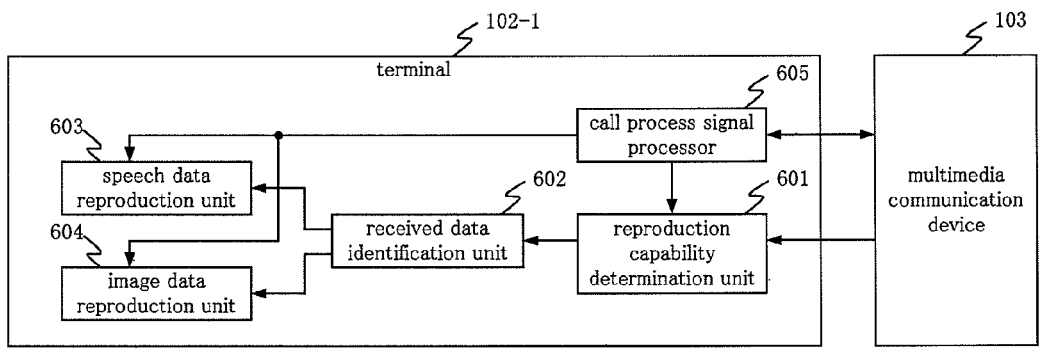
FIG. 6 shows one embodiment of the origination-side terminal shown in FIG. 1.

FIG. 6 shows an embodiment of terminal 102-1 shown in FIG. 1. In addition, of the form of terminal 102-1 shown in FIG. 1, FIG. 6 shows only the reception function parts relating to the present invention.

As shown in FIG. 6, terminal 102-1 shown in FIG. 1 is provided with reproduction capability determination unit 601, received data identification unit 602, speech data reproduction unit 603, image data reproduction unit 604, and call process signal processor 605.

Reproduction capability determination unit 601 decodes encoded data that are transmitted from multimedia communication device 103 and determines whether the decoded data can be reproduced on terminal 102-1. The determination criteria follow information reported from call process signal processor 605 of whether terminal 102-1 is calling terminal 102-2 or is in a call. When terminal 102-1 is calling terminal 102-2 or is in a call, it is determined that data that are transmitted from multimedia communication device 103 are data that can be reproduced on terminal 102-1. It may further be determined whether data that are transmitted from multimedia communication device 103 is content that has been read from content database 207 or not. This determination may be carried out by conferring identifiers to prescribed areas of content that are read from content database 207 in transmission data switch unit 203 and then by detecting the conferred identifiers in reproduction capability determination unit 601. By using these determination criteria, content that has been read from content database 207 of data that have been transmitted from multimedia communication device 103 while terminal 102-1 is calling terminal 102-2 is determined to be reproducible. In addition, even when data that are transmitted from multimedia communication device 103 are determined not to be content that has been read from content database 207, the data transmitted from multimedia communication device 103 is determined to be reproducible if terminal 102-1 is in a call. This is identical to the reproduction function of image data and speech data in a typical videophone terminal.

Received data identification unit 602 distinguishes whether the data that have been determined to be reproducible in reproduction capability determination unit 601 are speech data or image data. The identification method may be a typical method carried out in the related art.

Speech data reproduction unit 603 reproduces speech data that have been identified in received data identification unit 602. Here, when reproduction environment information has been supplied from call process signal processor 605, the speech data are reproduced based on this reproduction environment information. One example of speech data reproduction unit 603 is a speaker.

Image data reproduction unit 604 reproduces image data that have been identified in received data identification unit 602. Here, when reproduction environment information has been supplied from call process signal processor 605, the image data are reproduced based on this reproduction environment information.

One example of image data reproduction unit 604 is a display.

Call process signal processor 605 processes call process signals. Call process signal processor 605 further notifies reproduction capability determination unit 601 whether terminal 102-1 is calling terminal 102-2 or whether terminal 102-1 is in a call. Call process signal processor 605 further supplies reproduction environment information that is transmitted from multimedia communication device 103 to speech data reproduction unit 603 and image data reproduction unit 604. Call process signal processor 605 further transmits reproduction environment information relating to encoded data transmitted from terminal 102-1 to multimedia communication device 103.

The form of terminal 102-1 shown in FIG. 6 is also the same in embodiments described hereinbelow.

Content that has been read from content database 207 is thus reproduced on terminal 102-1 using reproduction environment information while terminal 102-1 is calling terminal 102-2. In addition, when the call begins, the data of images or speech that are transmitted from terminal 102-2 are reproduced on terminal 102-1 using reproduction environment information.

The data formats that can be reproduced on terminal 102-1-102-n may differ for each terminal. As a result, instructions may be issued from call process signal processor 201 to transmission data switch unit 203 such that, when encoded data are transmitted to origination-side terminal data transmitter 202, the encoded data that are transmitted are converted to a data format that can be decoded and reproduced in terminals 102-1-102-n that are the transmission destinations and then this data is supplied. In this case, the actual data conversion is carried out in data converter 303 of transmission data switch unit 203 shown in FIG. 3.

FIG. 7 shows the construction of the conversion information database shown in FIG. 2.

As shown in FIG. 7, conversion information database 208 shown in FIG. 2 stores information for conversion to a data format that can be decoded and reproduced in each of terminals 102-1-102-n in correspondence with identification numbers that have been individually conferred to terminals 102-1-102-n. In FIG. 7, the identification numbers of terminals 102-1-102-n are shown as 102-1-102-n, but these identification numbers may be any identification numbers that are individually conferred to terminals 102-1-102-n and that, when implementing call processing, are individually conferred to terminals 102-1-102-n and transmitted from terminals 102-1-102-n to multimedia communication device 103. In addition, conversion information such as the encoding method, encoding bit rate, frame rate, image size, profile, level, encoding options, encoding frame type composition, video packet size, intraframe spacing, intra-macroblock number and quantization value are stored as conversion information. In FIG. 7, the columns of each item of information are blank, but this omission is only an abbreviation. The definitions of each item of conversion information are shown hereinbelow.

The encoding method is a moving picture compression encoding method such as ITU-T Recommendation H.263, H.264, or ISO/IEC Recommendation MPEG-4.

The encoding bit rate is the amount of encoding per second when compressing moving picture images.

The frame rate is the number of frames per second when compressing moving picture images.

The image size is information of the size of an image that can be reproduced on terminals 102-1-102-n, examples that can be offered being QCIF (176 picture elements horizontally×144 picture elements vertically) and CIF (352 picture elements horizontally×288 picture elements vertically).

The profile is the definition of the constituent techniques that are involved, examples including resync marker, data partitioning, and reversible VLC in the case of simple profiles in MPEG-4.

Level is a definition of the bit rates or image sizes that are involved, examples including a case in which the maximum image size is QCIF at a maximum bit rate of 64 kbps in the case of Level 1 in MPEG-4.

The encoding options are the optional capabilities when coding, examples being resync markers for strengthening resistance to errors, data partitioning, and reversible VLC in the case of MPEG-4.

The encoding frame type composition is the type of coding frames, and encoding frame type compositions include intramode for implementing in-frame coding and intermode for carrying out coding of interframe prediction differential images.

The video packet size is the packet size of the encoded data for which encoded data of images can be reproduced on terminals 102-1-102-n, and in the case of MPEG-4, is a unit of encoding made up of resync markers and encoding information that follows the resync markers.

The intraframe spacing is the spacing of frames that have been encoded in intra-mode.

The intra-macroblock number is the number of times encoding has been carried out in a macroblock in macroblock units realized by partitioning a particular frame. Here, partitioning is in 99 macroblocks in the case of QCIF.

The quantization value is used in quantizing, which is a process for decreasing the amount of coding by dividing a coefficient obtained through a DCT (Discrete Cosine Transform) by a particular value that is to be expressed by a coefficient of a small value, the quantization value being the divisor.

These values may be single determined values that are stored, or may be values having a prescribed range (width) that are stored.

When the above-described instructions are carried out from call process signal processor 201, conversion information in terminal 102-1 that reproduces encoded data is read from conversion information database 208 by call process signal processor 201. This conversion information is placed in correspondence with the identification number of terminal 102-1 that is contained in call process signal received in call process signal processor 201. The conversion information that has been read is supplied from call process signal processor 201 to transmission data switch unit 203. Data conversion is then carried out for the encoded data that are supplied from transmission data switch unit 203 in data converter 303 in transmission data switch unit 203 based on the conversion information, whereby encoded data that have been converted to a data format that can be decoded and reproduced in terminal 102-1 are transmitted from origination-side terminal data transmitter 202 to terminal 102-1.

Alternatively, transmission data switch unit 203 may be configured to one time decode the encoded data that are received as input and then recode and supply the data, or may be configured to convert only the syntax of the encoded data that are received as input and then supply the data.

Figure 8:
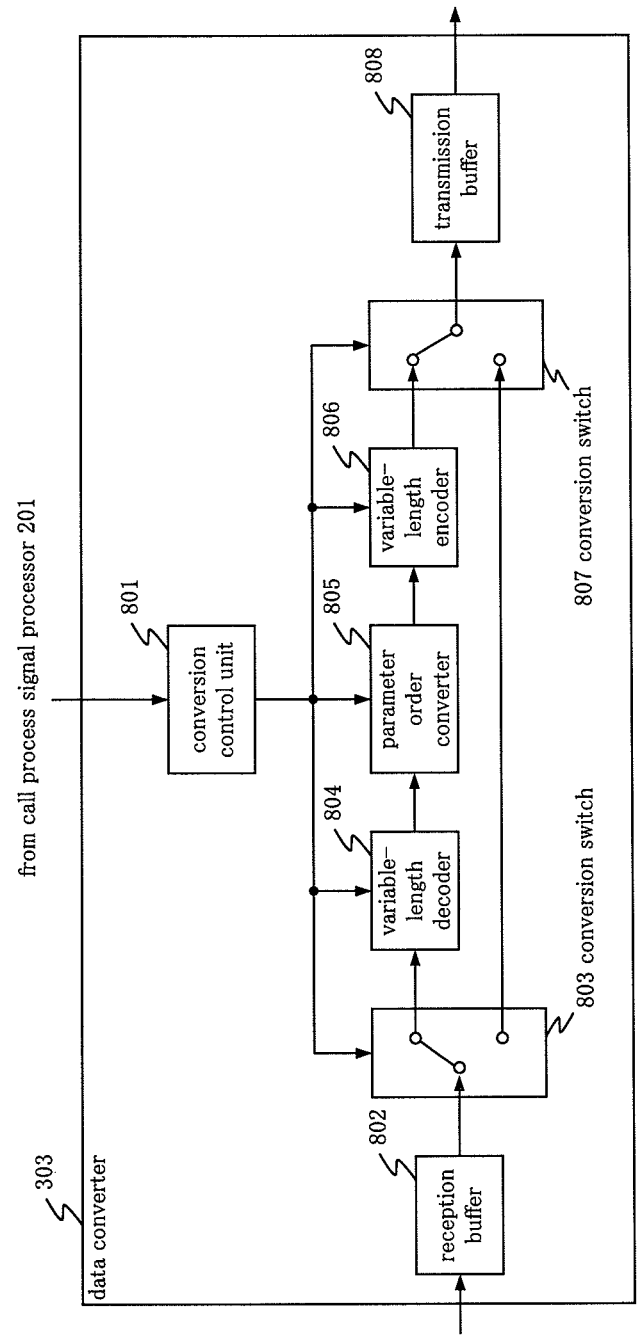
FIG. 8 shows one configuration of the data converter shown in FIG. 3 when syntax conversion is carried out.

FIG. 8 shows the configuration of data converter 303 shown in FIG. 3 when syntax conversion is carried out.

As shown in FIG. 8, when syntax conversion is carried out, data converter 303 shown in FIG. 3 is composed of: conversion control unit 801, reception buffer 802, conversion switches 803 and 807, variable-length decoder 804, parameter order converter 805, variable-length encoder 806, and transmission buffer 808.

Conversion control unit 801 receives DCI (Decoder Configuration Information) that is supplied from call process signal processor 201, compares the pre-conversion DCI and the post-conversion DCI, and supplies conversion control information. The conversion in this case is conversion of at least one information item from among: the encoding method, encoding bit rate, frame rate, image size, profile, level, encoding options, encoding frame type composition, video packet size, intraframe spacing, intra-macroblock number and quantization value in data converter 303. If, as a result of comparison of the pre-conversion DCI and post-conversion DCI, the pre-conversion DCI is found to differ from the post-conversion DCI, syntax conversion is carried out. On the other hand, if pre-conversion DCI and post-conversion DCI are the same, syntax conversion is not carried out.

Reception buffer 802 first stores moving image data that have been supplied from termination-side terminal data receiver 204 and then supplies the data at a prescribed timing.

Conversion switch 803 serves the function of switching between converting or not converting the syntax in video packets supplied from reception buffer 802 in accordance with conversion control information that has been supplied from conversion control unit 801. When syntax is to be converted, conversion switch 803 supplies video packets supplied from reception buffer 802 to variable-length decoder 804. However, when syntax is not to be converted, conversion switch 803 supplies the video packets supplied from reception buffer 802 to conversion switch 807.

Variable-length decoder 804 carries out a variable-length decoding process upon the video packets supplied from conversion switch 803 using a normal VLC encoding chart for parameters other than the AC components. Variable-length decoder 804 further has the function of controlling the variable-length decoding process in accordance with the conversion control information supplied from conversion control unit 801. Regarding the AC components, variable-length decoder 804 carries out the variable-length decoding process using a normal VLC encoding chart when reversible VLC is not used and using an RVLC encoding chart when reversible VLC is used.

Parameter order converter 805 reorders a bit sequence based on the results of variable-length decoding in variable-length decoder 804 of video packets supplied from conversion switch 803. This reordering is carried out based on the MPEG-4 standard, which is a standard for handling all moving picture/speech as digital data. In addition, parameter order converter 805 has the function of controlling the process of reordering a bit sequence in accordance with conversion control information supplied from conversion control unit 801.

Variable-length encoder 806 carries out the process of variable-length encoding of only the AC component. Variable-length encoder 806 also has the function of controlling the variable-length encoding process according to the conversion control information supplied from conversion control unit 801. Variable-length encoder 806 carries out the variable-length encoding process using a normal VLC coding chart when reversible VLC is not used and using the RVLC coding chart when reversible VLC is used.

Conversion switch 807 has the function of switching between converting or not converting the syntax in video packets supplied from reception buffer 802 in accordance with the conversion control information supplied from conversion control unit 801. When syntax is to be converted, conversion switch 807 supplies video packets supplied from variable-length encoder 806 to transmission buffer 808. On the other hand, when syntax is not to be converted, conversion switch 807 supplies the video packets supplied from conversion switch 803 to transmission buffer 808.

Transmission buffer 808 first stores video packets supplied from conversion switch 807 and then supplies the video packets to origination-side terminal data transmitter 202.

A configuration is also possible in which content read from content database 207 is reproduced on terminal 102-1 after a call has been completed between terminal 102-1 and terminal 102-2.

Figure 9:
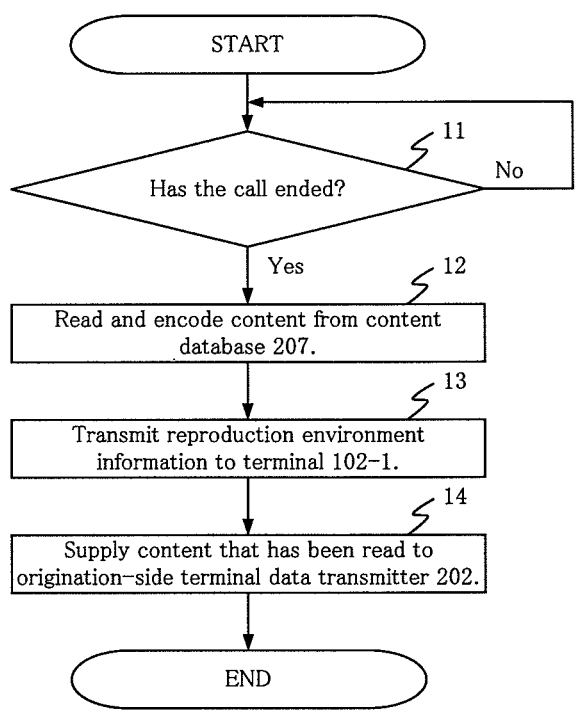
FIG. 9 is a flow chart for explaining the second method of the multimedia communication method in the multimedia communication device shown in FIG. 2.

FIG. 9 is a flow chart for explaining the second method of the multimedia communication method in multimedia communication device 103 shown in FIG. 2.

When a call is being carried out between terminal 102-1 and terminal 102-2, it is determined in call process signal processor 201 whether the call being carried out between terminal 102-1 and terminal 102-2 has ended or not in Step 11.

When it is determined that the call has ended, instructions are issued from call process signal processor 201 to transmission data switch unit 203 to read content from content database 207, encode the content, and supply the encoded data to origination-side terminal data transmitter 202. In accordance with these instructions, transmission data switch unit 203 reads content from content database 207 and encodes the content in Step 12.

At this time, the content that is read may be content that is selected in accordance with the termination-side terminal as in the first method that was described using FIG. 5. Alternatively, the content may also be selected and read in accordance with the origination-side terminal.

The reproduction environment information that has been placed in correspondence with the content is also read together with the content from content database 207, and the reproduction environment information that has been read is supplied from transmission data switch unit 203 to call process signal processor 201. The reproduction environment information that is applied as input to call process signal processor 201 is transmitted from call process signal processor 201 to terminal 102-1 in Step 13.

The encoded data of the content that has been encoded are transmitted to origination-side terminal data transmitter 202 in Step 14.

The encoded data are then transmitted from origination-side terminal data transmitter 202 to terminal 102-1.

When transmitting encoded data to terminal 102-1, the encoded data may be converted in data converter 303 shown in FIG. 3 as in the first method explained using FIG. 5.

Alternatively, a configuration is also possible in which, together with the transmission of the reproduction environment information of content to terminal 102-1 in Step 13, reproduction environment information relating to data that are transmitted from pre-registered terminal 102-2 are transmitted to terminal 102-1.

In this way, after a call has ended between terminal 102-1 and terminal 102-2, content that has been read from content database 207 is reproduced on terminal 102-1 using the reproduction environment information. Regarding the time of this reproduction, the reproduction may be for only a preset time from the end of the call. In this case, a timer for measuring the reproduction time may be provided in multimedia communication device 103 or may be provided in terminal 102-1.

In the embodiment described hereinabove, when a call takes place from terminal 102-1 to terminal 102-2, prescribed content is reproduced on terminal 102-1 under conditions suitable to the content and to terminal 102-1 while terminal 102-1 is calling terminal 102-2 or after the call between terminal 102-1 and terminal 102-2 has ended.

Second Embodiment

Explanation next regards the second embodiment of multimedia communication device 103 shown in FIG. 1.

Figure 10:
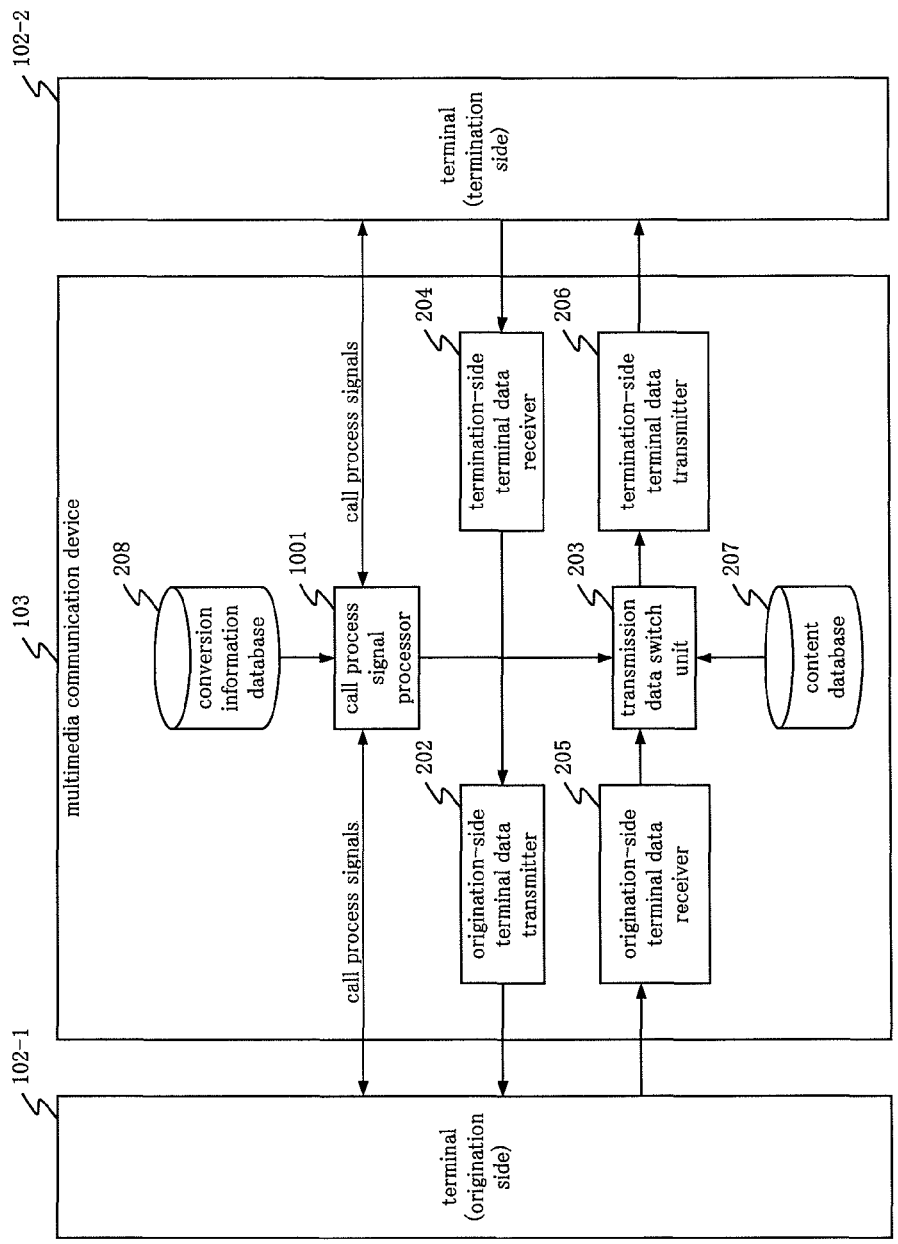
FIG. 10 shows the second embodiment of the multimedia communication device shown in FIG. 1.

FIG. 10 shows the second embodiment of multimedia communication device 103 shown in FIG. 1. Explanation here regards a case in which a communication takes place between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described below regardless of which of terminals 102-3-102-n is the origination-side terminal or the termination-side terminal.

As shown in FIG. 10, the second embodiment of multimedia communication device 103 shown in FIG. 1 is made up from: call process signal processor 1001, origination-side terminal data transmitter 202, transmission data switch unit 203, termination-side terminal data receiver 204, origination-side terminal data receiver 205, termination-side terminal data transmitter 206, and content database 207.

Call process signal processor 1001 carries out the transmission and reception of call process signals between terminal 102-1 and terminal 102-2. Call process signal processor 1001 also issues instructions to transmission data switch unit 203 to read content from content database 207 at a prescribed time or at the timing of reception of call process signals from terminal 102-1 or terminal 102-2. In addition, call process signal processor 1001 issues instructions to transmission data switch unit 203 to transmit the content that has been read from content database 207 to terminal 102-2 at a prescribed time or at the timing of reception of call process signals from terminal 102-1 or terminal 102-2. Alternatively, call process signal processor 1001 issues instructions to transmission data switch unit 203 to transmit encoded data transmitted from terminal 102-1 and received in multimedia communication device 103 to terminal 102-2 at a prescribed time or at the timing of reception of call process signals from terminal 102-1 or terminal 102-2. Call process signal processor 1001 can also use, for example, SIP of the IETF standards as the call process signals.

Origination-side terminal data transmitter 202 transmits encoded data that have been supplied from termination-side terminal data receiver 204 to terminal 102-1. The processes in origination-side terminal data transmitter 202 are the same as the processes in origination-side terminal data transmitter 202 in the first embodiment.

Transmission data switch unit 203 reads content from content database 207 and encodes the content in accordance with instructions from call process signal processor 1001. In addition, in accordance with instructions from call process signal processor 1001, transmission data switch unit 203 switches the encoded data that is supplied to termination-side terminal data transmitter 206 to either the encoded data of content that has been read from content database 207 and has been encoded or encoded data that have been supplied from origination-side terminal data receiver 205 (encoded data that are transmitted from terminal 102-1). The processes in transmission data switch unit 203 are the same as the processes in transmission data switch unit 203 in the first embodiment.

Termination-side terminal data receiver 204 receives encoded data transmitted from terminal 102-2 and supplies the data to origination-side terminal data transmitter 202. The processes in termination-side terminal data receiver 204 are the same as the processes in termination-side terminal data receiver 204 in the first embodiment.

Origination-side terminal data receiver 205 receives encoded data that have been transmitted from terminal 102-1 and supplies the encoded data that have been received to transmission data switch unit 203. The processes in origination-side terminal data receiver 205 are the same as the processes in origination-side terminal data receiver 205 in the first embodiment.

Termination-side terminal data transmitter 206 transmits the encoded data supplied from transmission data switch unit 203 to terminal 102-2. The processes in termination-side terminal data transmitter 206 are the same as the processes in termination-side terminal data transmitter 206 in the first embodiment.

Content database 207 is the same as in the first embodiment. In addition, of the type of constructions of content database 207 in the first embodiment (shown in FIG. 4), content database 207 may be the type of construction in which reproduction environment information is not stored.

Conversion information database 208 is the same as in the first embodiment.

The following explanation regards the multimedia communication method in multimedia communication device 103 shown in FIG. 10.

Figure 11:
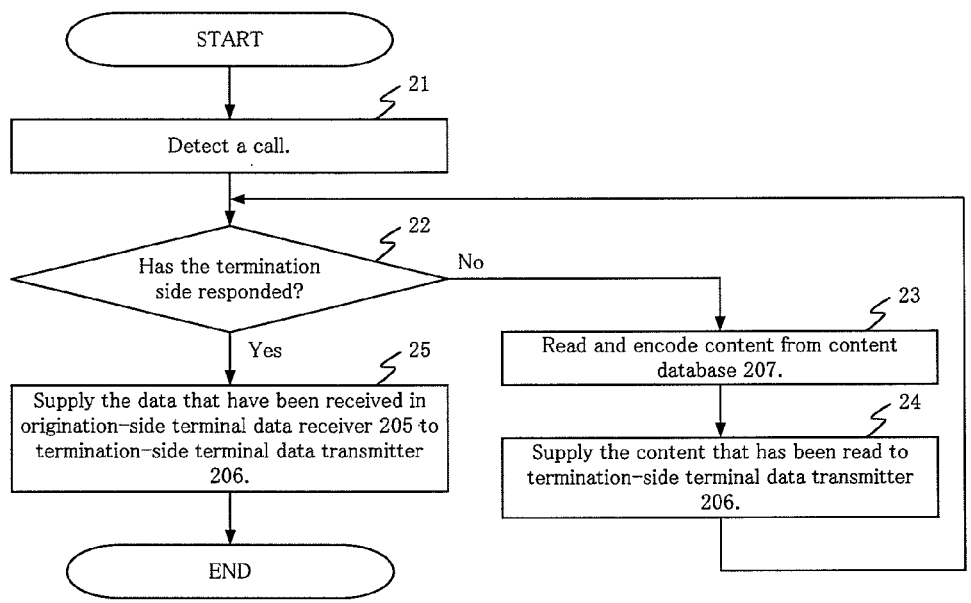
FIG. 11 is a flow chart for explaining the first method of the multimedia communication method in the multimedia communication device shown in FIG. 10.

FIG. 11 is a flow chart for explaining the first method of the multimedia communication method in multimedia communication device 103 shown in FIG. 10.

First, upon the detection in call process signal processor 1001 of call origination from terminal 102-1 to terminal 102-2 shown in FIG. 10, call process signal processor 1001 determines in Step 22 whether terminal 102-2, that is the termination-side terminal, has responded or not.

If it is determined in call process signal processor 1001 that terminal 102-2 has not responded, call process signal processor 1001 issues instructions to transmission data switch unit 203 to read content from content database 207, encode the content, and supply the encoded data to termination-side terminal data transmitter 206. In accordance with these instructions, transmission data switch unit 203 reads content from content database 207 and encodes the content in Step 23 and supplies the encoded data of the content that has been encoded to termination-side terminal data transmitter 206 in Step 24.

At this time, the read content may be content that has been selected in accordance with termination-side terminal as in the first embodiment, or the content may be selected and read in accordance with the origination-side terminal.

The encoded data of the content is then transmitted to terminal 102-2 from termination-side terminal data transmitter 206.

On the other hand, when it is determined in call process signal processor 1001 that terminal 102-2 has responded, call process signal processor 1001 issues instructions to transmission data switch unit 203 to supply the encoded data that have been supplied from origination-side terminal data receiver 205 to termination-side terminal data transmitter 206. In accordance with these instructions, transmission data switch unit 203 supplies the encoded data that have been supplied from origination-side terminal data receiver 205 to termination-side terminal data transmitter 206 in Step 25. The encoded data are then transmitted from termination-side terminal data transmitter 206 to terminal 102-2.

Figure 12:
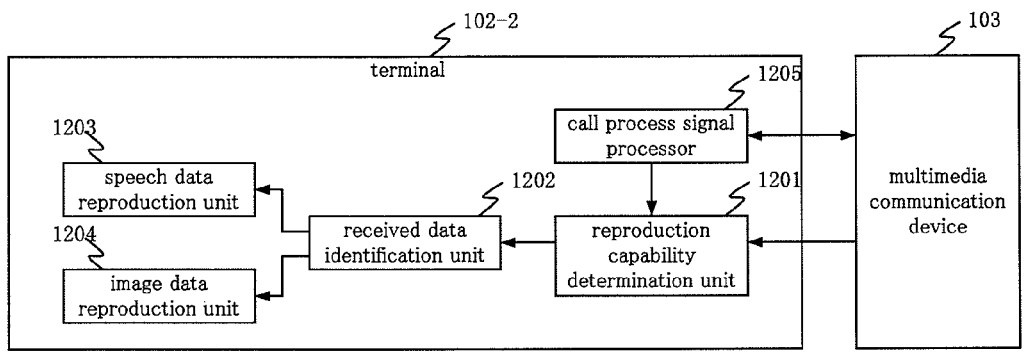
FIG. 12 shows an embodiment of the termination-side terminal shown in FIG. 1.

FIG. 12 shows an embodiment of terminal 102-2 shown in FIG. 1. Of the form of terminal 102-2 shown in FIG. 1, FIG. 12 shows only the reception function parts relating to the present invention.

As shown in FIG. 12, terminal 102-2 shown in FIG. 1 is provided with reproduction capability determination unit 1201, received data identification unit 1202, speech data reproduction unit 1203, image data reproduction unit 1204, and call process signal processor 1205.

Reproduction capability determination unit 1201 decodes the encoded data that are transmitted in from multimedia communication device 103 and determines whether the decoded data can be reproduced on terminal 102-2. The determination criteria depend on the determination of whether terminal 102-1 is calling terminal 102-2 or whether terminal 102-2 is in a call or not. If terminal 102-1 is calling terminal 102-2, or if terminal 102-2 is in a call, the data that have been transmitted from multimedia communication device 103 are determined to be data that can be reproduced on terminal 102-2. Reproduction capability determination unit 1201 may also determine whether the data that have been transmitted from multimedia communication device 103 are content that has been read from content database 207 or not. This determination may be carried out by conferring identifiers to pre-scribed areas of content that has been read from content database 207 in transmission data switch unit 203 and then detecting the conferred identifiers in reproduction capability determination unit 1201.

Using these determination criteria, of the data that have been transmitted from multimedia communication device 103 while terminal 102-1 is calling terminal 102-2, content that has been read from content database 207 can be determined as reproducible.

Even when data that have been transmitted from multimedia communication device 103 are determined not to be content that has been read from content database 207, data that have been transmitted in from multimedia communication device 103 are determined to be reproducible if terminal 102-2 is in a call. This process is the same as the reproduction capability of image data and speech data in a typical videophone terminal.

Received data identification unit 1202 identifies if data that have been determined to be reproducible in reproduction capability determination unit 1201 are speech data or image data. The determination method may be a typical method implemented in the related art.

Speech data reproduction unit 1203 reproduces speech data that have been identified in received data identification unit 1202. One example of speech data reproduction unit 1203 that can be offered is a speaker.

Image data reproduction unit 1204 reproduces image data that have been identified in received data identification unit 1202. One example of image data reproduction unit 1204 that can be offered is a display.

Call process signal processor 1205 processes call process signals. In addition, call process signal processor 1205 also transmits reproduction environment information relating to encoded data that are transmitted from terminal 102-2 to multimedia communication device 103.

The form of terminal 102-2 shown in FIG. 12 is the same as in the embodiments described hereinbelow.

In this way, content that has been read from content database 207 are reproduced on terminal 102-2 while terminal 102-1 is calling terminal 102-2. In addition, the data of images or speech that have been transmitted from terminal 102-1 are reproduced on terminal 102-2 when a call begins.

In addition, a configuration may be adopted in which content that has been read from content database 207 is reproduced on terminal 102-2 after the end of a call between terminal 102-1 and terminal 102-2.

Figure 13:
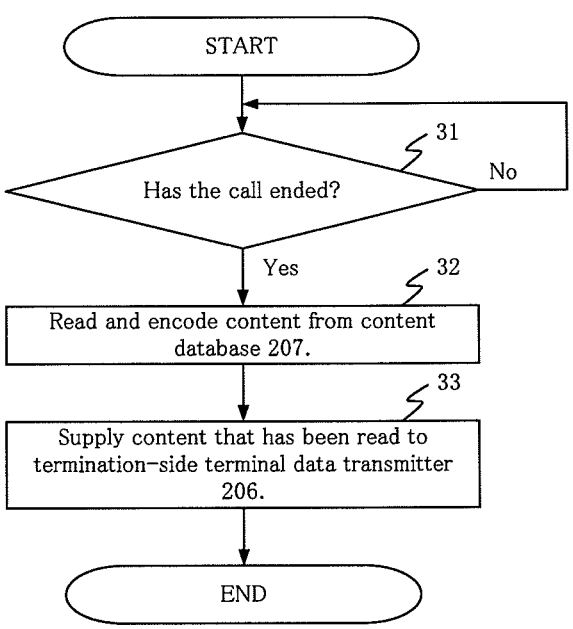
FIG. 13 is a flow chart for explaining the second method of the multimedia communication method in the multimedia communication device shown in FIG. 10.

FIG. 13 is a flow chart for explaining the second method of the multimedia communication method in multimedia communication device 103 shown in FIG. 10.

When a call is taking place between terminal 102-1 and terminal 102-2, call process signal processor 1001 determines in Step 31 whether the call that is taking place between terminal 102-1 and terminal 102-2 has ended or not.

If call process signal processor 1001 determines that the call has ended, call process signal processor 1001 issues instructions to transmission data switch unit 203 to read content from content database 207, encode the content, and supply the encoded data to termination-side terminal data transmitter 206. In accordance with these instructions, transmission data switch unit 203 reads content from content database 207 and encodes the content in Step 32 and supplies the encoded data of the content that has been encoded to termination-side terminal data transmitter 206 in Step 33.

At this time, the content that is read may be content that is selected in accordance with the termination-side terminal as in the first embodiment, or may be content that is selected and read in accordance with the origination-side terminal.

In this way, after the end of a call between terminal 102-1 and terminal 102-2, content that has been read from content database 207 is reproduced on terminal 102-2. Regarding the reproduction time, the content may be reproduced for only a preset time interval after the end of a call, in which case a timer for measuring the reproduction time may be provided in multimedia communication device 103 or provided in terminal 102-2.

The data format that can be reproduced in terminals 102-1-102-n may differ for each terminal, and as a result, a configuration may be adopted in which call process signal processor 1001 issues instructions to transmission data switch unit 203 to, when transmitting encoded data to termination-side terminal data transmitter 206, to convert the encoded data that are transmitted to a data format that can be decoded and reproduced in terminals 102-1-102-n that are the transmission destinations and to supply the encoded data. In this case, the actual data conversion is carried out in data converter 303 of transmission data switch unit 203 shown in FIG. 3.

When call process signal processor 1001 issues the above-described instructions, call process signal processor 1001 reads the conversion information in terminal 102-2 that reproduces the encoded data from conversion information database 208. This conversion information is placed in correspondence with the identification number of terminal 102-2 that is contained in the call process signals received in call process signal processor 1001. The conversion information that is read is supplied from call process signal processor 1001 to transmission data switch unit 203. Data conversion is then carried out for the encoded data that are supplied from transmission data switch unit 203 in data converter 303 in transmission data switch unit 203 based on the conversion information, whereby the encoded data that have been converted to a data format that can be decoded and reproduced in terminal 102-2 are transmitted from termination-side terminal data transmitter 206 to terminal 102-2. The processes of this data conversion are the same as shown in the first embodiment.

When a call is from terminal 102-1 to terminal 102-2 in the present embodiment, as described hereinabove, prescribed content is reproduced in terminal 102-2 under conditions appropriate to terminal 102-2 while terminal 102-1 is calling terminal 102-2 or after the end of a call between terminal 102-1 and terminal 102-2.

Third Embodiment

Multimedia communication device 103 provided with both the functions of the above-described first embodiment and the functions of the second embodiment can also be considered.

Figure 14:
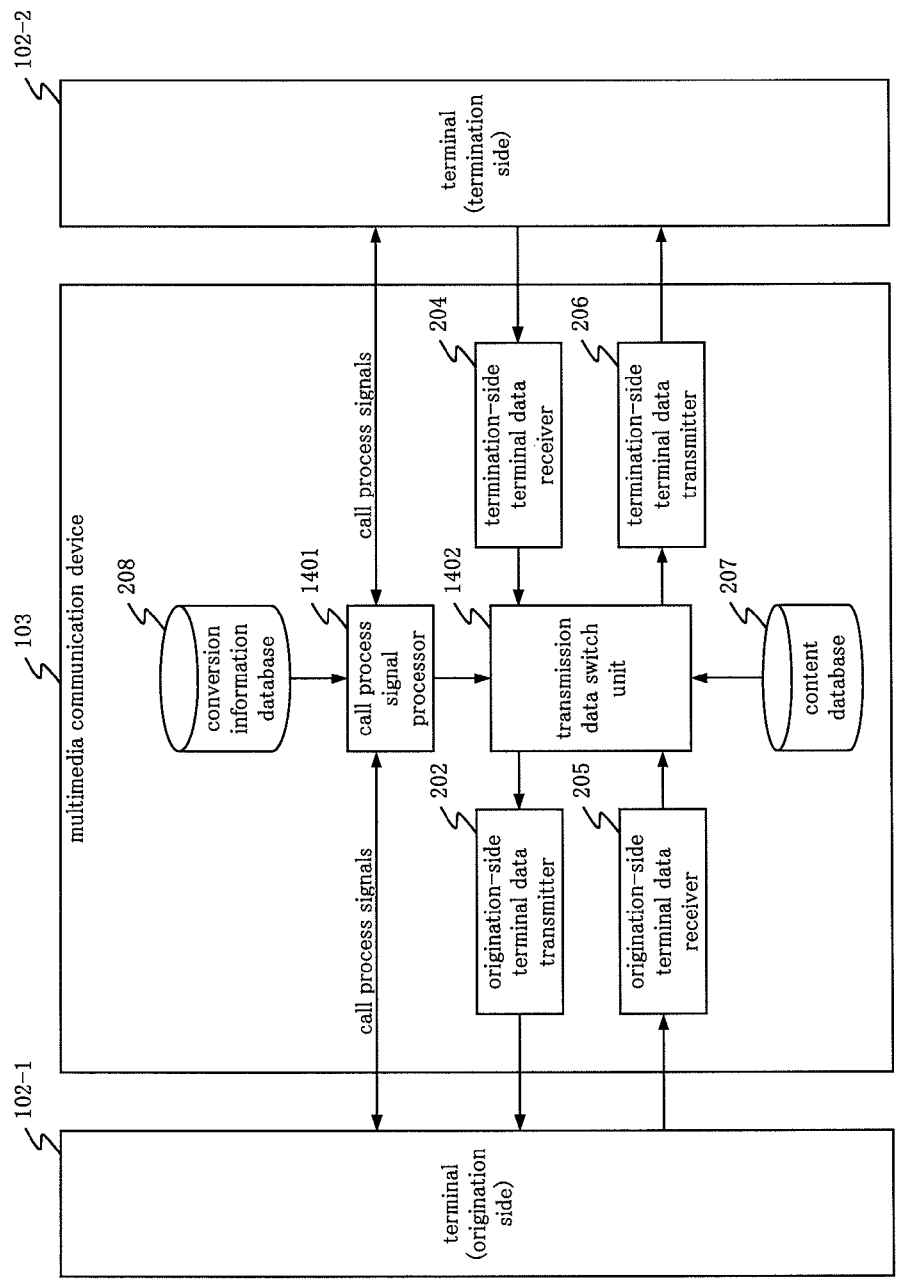
FIG. 14 shows the third embodiment of the multimedia communication device shown in FIG. 1.

FIG. 14 shows the third embodiment of multimedia communication device 103 shown in FIG. 1. An example is here described in which communication takes place between terminal 102-1 and terminal 102-2. Terminal 102-1 is the origination-side terminal and terminal 102-2 is the termination-side terminal that is the communication partner of terminal 102-1. The operations of terminals 102-3-102-n are the same as described hereinbelow regardless of which of terminals 102-3-102-n is the origination-side terminal or the termination-side terminal.

As shown in FIG. 14, the third embodiment of multimedia communication device 103 shown in FIG. 1 is made up from: call process signal processor 1401, origination-side terminal data transmitter 202, termination-side terminal data receiver 204, origination-side terminal data receiver 205, termination-side terminal data transmitter 206, content database 207, and transmission data switch unit 1402.

Call process signal processor 1401 carries out transmission and reception of call process signals between terminal 102-1 and terminal 102-2. Call process signal processor 1401 transmits and receives between terminal 102-1 and terminal 102-2 the reproduction environment information of encoded data that are to be transmitted and received between terminal 102-1 and terminal 102-2. The transmission and reception of this reproduction environment information may employ, for example, SDP protocol of the IETF standard. Call process signal processor 1401 further issues instructions to transmission data switch unit 1402 to read content from content database 207 at a prescribed time or at the timing of the reception of call process signals from terminal 102-1 or terminal 102-2. Call process signal processor 1401 also issues instructions to transmission data switch unit 1402 to transmit content that has been read from content database 207 to terminal 102-2 at a prescribed time or at the timing of reception of call process signals from terminal 102-1 or terminal 102-2. Alternatively, call process signal processor 1401 issues instructions to transmission data switch unit 1402 to transmit encoded data that have been transmitted from terminal 102-1 and received in multimedia communication device 103 to terminal 102-2 at a prescribed time or at the timing of reception of call process signals from terminal 102-1 or terminal 102-2. Call process signal processor 1401 further issues instructions to transmission data switch unit 1402 to transmit content that has been read from content database 207 to terminal 102-1 at a prescribed time or at the timing of reception of call process signals from terminal 102-1 or terminal 102-2. Alternatively, call process signal processor 1401 issues instructions to transmission data switch unit 1402 to transmit encoded data that have been transmitted from terminal 102-2 and received in multimedia communication device 103 to terminal 102-1 at a prescribed time or at the timing of reception of call process signals from terminal 102-1 or terminal 102-2. In addition, call process signal processor 1401 can use, for example, SIP of the IETF standard as the call process signals.

Origination-side terminal data transmitter 202 transmits encoded data that have been supplied from transmission data switch unit 1402 to terminal 102-1. The processes in origination-side terminal data transmitter 202 are the same as the processes in origination-side terminal data transmitter 202 in the first and second embodiments.

Termination-side terminal data receiver 204 receives the encoded data that have been transmitted from terminal 102-2 and supplies the data to transmission data switch unit 1402. The processes in termination-side terminal data receiver 204 are the same as the processes in termination-side terminal data receiver 204 in the first and second embodiments.

Origination-side terminal data receiver 205 receives the encoded data that have been transmitted from terminal 102-1 and supplies the encoded data that have been received to transmission data switch unit 1402. The processes in origination-side terminal data receiver 205 are the same as the processes in origination-side terminal data receiver 205 in the first and second embodiments.

Termination-side terminal data transmitter 206 transmits the encoded data that have been supplied from transmission data switch unit 1402 to terminal 102-2. The processes in termination-side terminal data transmitter 206 are the same as the processes in termination-side terminal data transmitter 206 in the first and second embodiments.

Content database 207 is the same as in the first and second embodiments.

Conversion information database 208 is the same as in the first and second embodiments.

Transmission data switch unit 1402 reads content from content database 207 and encodes the content in accordance with instructions from call process signal processor 1401. Transmission data switch unit 1402 also, in accordance with instructions from call process signal processor 1401, switches the encoded data that are to be supplied to origination-side terminal data transmitter 202 to either encoded data of content that has been read from content database 207 and has been encoded or encoded data that have been supplied from termination-side terminal data receiver 204 (encoded data transmitted from terminal 102-2). Transmission data switch unit 1402 also, in accordance with instructions from call process signal processor 1401, switches the encoded data to be supplied to termination-side terminal data transmitter 206 to either encoded data of content that has been read from content database 207 and has been encoded or encoded data that have been supplied from origination-side terminal data receiver 205 (encoded data that have been transmitted from terminal 102-1). Transmission data switch unit 1402 is of a form in which transmission data switch unit 203 in the first and second embodiments is provided with two directions: the data direction from the originator terminal to the terminator terminal and the data direction from the terminator terminal to the originator terminal.

By means of this form, multimedia communication device 103 can be realized that is provided with both the functions of the first embodiment and the functions of the second embodiment.

Fourth Embodiment

Figure 15:
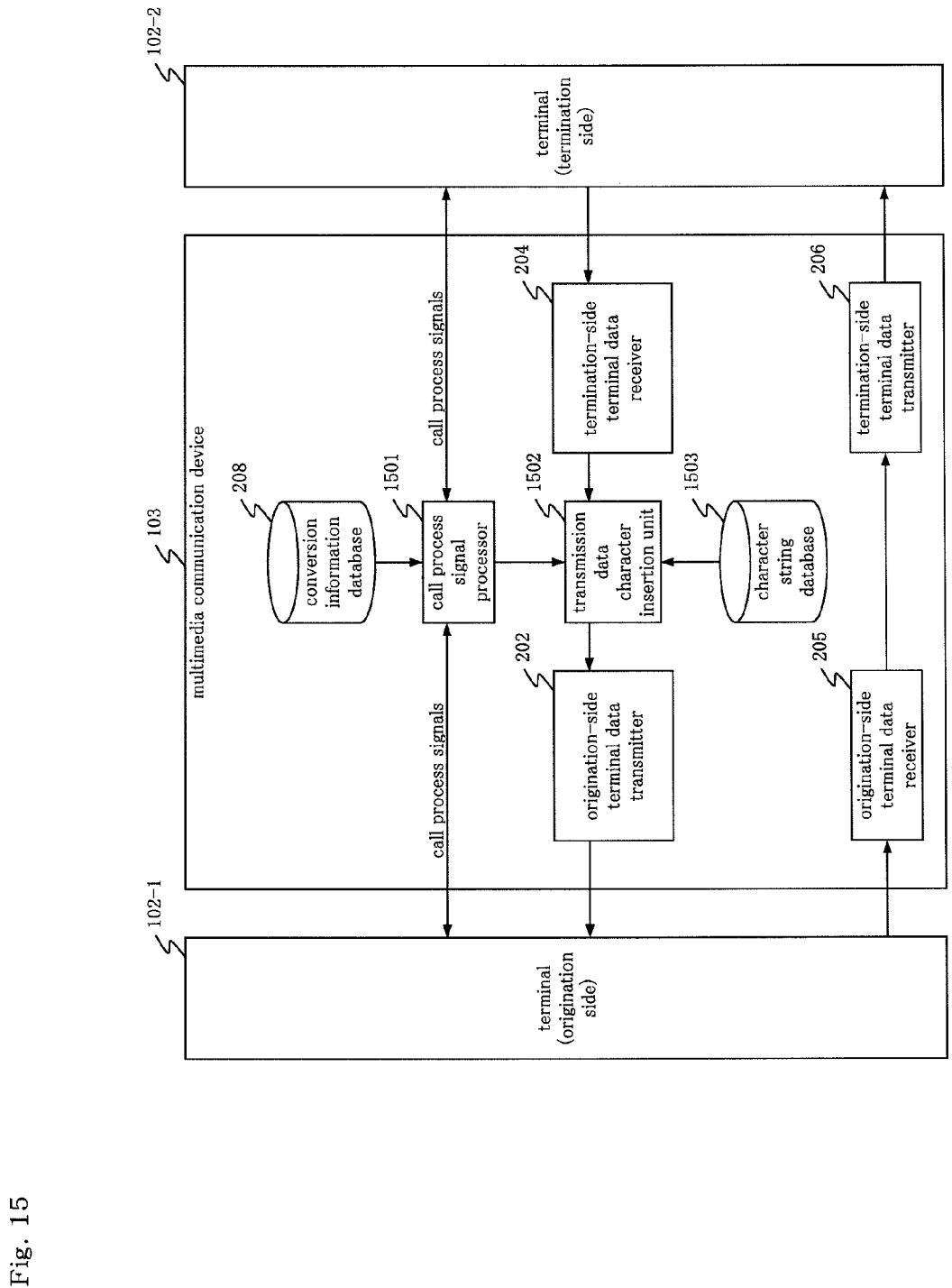
FIG. 15 shows the fourth embodiment of the multimedia communication device shown in FIG. 1.

FIG. 15 shows the fourth embodiment of multimedia communication device 103 shown in FIG. 1. An example is here described in which communication is realized between terminal 102-1 and terminal 102-2. In addition, terminal 102-1 is the origination-side terminal, and terminal 102-2 is the termination-side terminal that is the communication partner of terminal 102-1. In addition, the operations in terminals 102-3-102-n are the same as described below regardless of which of terminals 102-3-102-n is the origination-side terminal or the termination-side terminal.

As shown in FIG. 15, the fourth embodiment of multimedia communication device 103 shown in FIG. 1 is made up from: call process signal processor 1501, origination-side terminal data transmitter 202, termination-side terminal data receiver 204, origination-side terminal data receiver 205, termination-side terminal data transmitter 206, transmission data character insertion unit 1502, and character string database 1503.

Call process signal processor 1501 carries out transmission and reception of call process signals between terminal 102-1 and terminal 102-2. Call process signal processor 1501 also issues instructions to transmission data character insertion unit 1502 to read a character string from character string database 1503 at a prescribed time or at the timing of reception of call process signals from terminal 102-1 or terminal 102-2. Call process signal processor 1501 also issues instructions to transmission data character insertion unit 1502 to insert the character string that has been read from character string database 1503 into the encoded data to be transmitted to terminal 102-1 at a prescribed time or at the timing of reception of call process signals from terminal 102-1 or terminal 102-2. Call process signal processor 1501 can also use SIP of the IETF standard as the call process signals.

Origination-side terminal data transmitter 202 transmits encoded data that have been supplied from transmission data character insertion unit 1502 to terminal 102-1. The processes in origination-side terminal data transmitter 202 are the same as the processes in origination-side terminal data transmitter 202 in the first to third embodiments.

Termination-side terminal data receiver 204 receives encoded data that have been transmitted from terminal 102-2 and supplies the encoded data that have been received to transmission data character insertion unit 1502. The processes in termination-side terminal data receiver 204 are the same as the processes in termination-side terminal data receiver 204 in the first to third embodiments.

Origination-side terminal data receiver 205 receives the encoded data that have been transmitted from terminal 102-1 and supplies the data to termination-side terminal data transmitter 206. The processes in origination-side terminal data receiver 205 are the same as the processes in origination-side terminal data receiver 205 in the first to third embodiments.

Termination-side terminal data transmitter 206 transmits encoded data that have been supplied from origination-side terminal data receiver 205 to terminal 102-2. The processes in termination-side terminal data transmitter 206 are the same as the processes in termination-side terminal data transmitter 206 in the first to third embodiments.

Conversion information database 208 is the same as in the first to third embodiments.

Transmission data character insertion unit 1502 reads character strings from character string database 1503 in accordance with instructions from call process signal processor 1501 and inserts the character strings that have been read into encoded data that have been supplied from termination-side terminal data receiver 204. Transmission data character insertion unit 1502 then supplies the encoded data into which the character strings have been inserted to origination-side terminal data transmitter 202. The insertion of character strings here described is to superimpose the character strings on encoded data (images) that have been supplied from termination-side terminal data receiver 204. The synthesizing method may employ a method used in the related art.

Figures 16, 17:
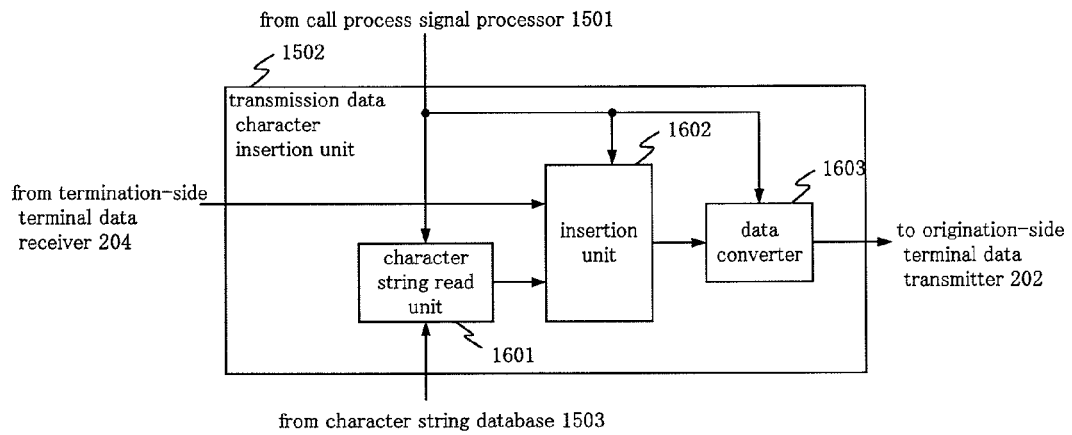
FIG. 16 shows one configuration of the transmission data character insertion unit shown in FIG. 15.
FIG. 17 shows one configuration of the character string database shown in FIG. 15.

FIG. 16 shows one configuration of transmission data character insertion unit 1502 shown in FIG. 15.

As shown in FIG. 16, transmission data character insertion unit 1502 shown in FIG. 15 is composed of character string read unit 1601, insertion unit 1602, and data converter 1603.

Character string read unit 1601 reads a character string from character string database 1503 when instructions to read a character string from character string database 1503 are issued from call process signal processor 1501.

Insertion unit 1602 inserts a character string that has been read from character string database 1503 into encoded data that have been supplied from termination-side terminal data receiver 204 when instructed from call process signal processor 1501 to insert a character string that has been read from character string database 1503 into encoded data that have been supplied from termination-side terminal data receiver 204.

Data converter 1603 converts encoded data into which a character string has been inserted in insertion unit 1602 to a data format that can be decoded and reproduced in terminal 102-1 that is the origination-side terminal. This conversion is realized by carrying out at least one conversion of the conversion information that is stored in conversion information database 208. Data converter 1603 may further be provided in a stage preceding insertion unit 1602. In other words, the character string may be inserted into data that have been converted in data converter 1603. Alternatively, a configuration may be adopted in which this data converter 1603 is not included.

A character string is stored in advance in character string database 1503. A plurality of character strings may be stored.

FIG. 17 shows the construction of character string database 1503 shown in FIG. 15.

As shown in FIG. 17, character string database 1503 shown in FIG. 15 stores character strings. Each of the character strings is stored in correspondence with an identification number that is individually conferred to each character string. For example, the character string "Good morning" is placed in correspondence with the identification number "1001." The character string "How are you?" is placed in correspondence with the identification number "1002." The character string "I've been accepted to a college!" is placed in correspondence with the identification number "1003."

In addition, attribute information of the character strings such as color, size, font may also be placed in correspondence with each character string that is stored in character string database 1503.

In addition, character string database 1503 may be connected outside multimedia communication device 103, and character strings may be read by multimedia communication device 103 as necessary.

Explanation next regards multimedia communication methods in multimedia communication device 103 shown in FIG. 15.

Figure 18:
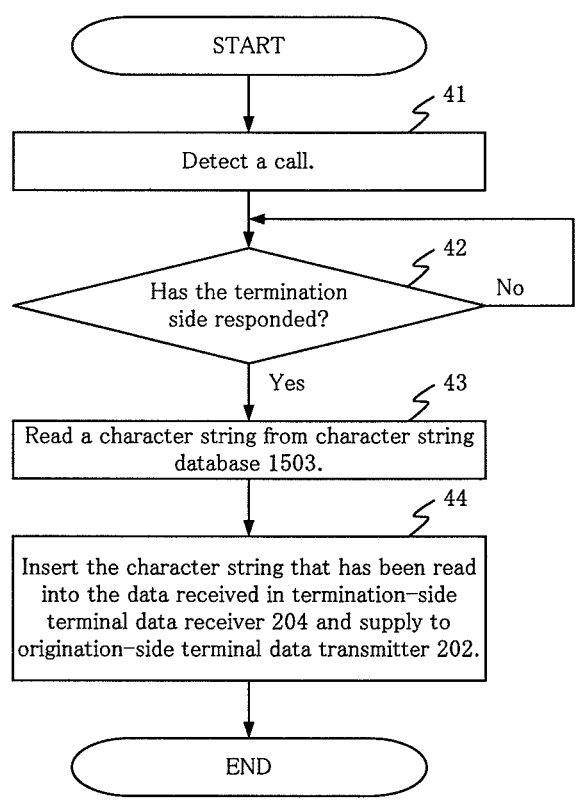
FIG. 18 is a flow chart for explaining the multimedia communication method in the multimedia communication device shown in FIG. 15.

FIG. 18 is a flow chart for explaining a multimedia communication method in multimedia communication device 103 shown in FIG. 15.

First, in Step 41, when call process signal processor 1501 detects a call origination from terminal 102-1 to terminal 102-2 shown in FIG. 15, call process signal processor 1501 determines whether or not terminal 102-2 that is the termination-side terminal has responded in Step 42.

If call process signal processor 1501 determines that terminal 102-2 has responded, call process signal processor 1501 issues instructions to transmission data character insertion unit 1502 to read a character string from character string database 1503 and to insert the character string that has been read into encoded data that have been supplied from termination-side terminal data receiver 204. In accordance with these instructions, a character string is read from character string database 1503 by transmission data character insertion unit 1502 in Step 43.

At this time, the character string that is read may be a character string that is selected in accordance with the termination-side terminal. In other words, correspondence between information for identifying terminals 102-1-102-n and identification numbers of character strings may be stored in advance in character string database 1503, and a character string may be selected and read in accordance with this correspondence. For example, a case is described in which information for identifying terminal 102-2 and the identification number "1002" are placed in correspondence. In this case, when the termination-side terminal is terminal 102-2, the character string of identification number "1002" may be read. Alternatively, a character string may be selected and read in accordance with the origination-side terminal. In this case, information for identifying the termination-side terminal or origination-side terminal is supplied from call process signal processor 1501 to transmission data character insertion unit 1502. In this case, the information for identifying terminals 102-1-102-n may be the telephone numbers of terminals 102-1-102-n or may be any information that can identify terminals 102-1-102-n. In addition, the character string that is read at this time is a character string that can be displayed on terminal 102-1.

The character string that has been read is then inserted into the encoded data that have been supplied from termination-side terminal data receiver 204, and the encoded data into which the character string has been inserted are supplied to origination-side terminal data transmitter 202 in Step 44. The position at which the character string can be inserted in the encoded data that have been supplied from termination-side terminal data receiver 204 is arbitrary and may be a predetermined position or may be a position designated from terminal 102-1. In addition, when attribute information of a character string has been stored in character string database 1503, the character string may be inserted based on the attribute information of the character string.

The encoded data are then transmitted from origination-side terminal data transmitter 202 to terminal 102-1 and the encoded data into which the character string has been inserted are reproduced on terminal 102-1.

When transmitting the encoded data to terminal 102-1, the encoded data may be converted in data converter 303 shown in FIG. 3 as in the first to third embodiments.

As described in the foregoing explanation, when a call is carried out from terminal 102-1 to terminal 102-2 in the present embodiment, a prescribed character string is inserted into the encoded data that are transmitted from terminal 102-2 to terminal 102-1 and the encoded data into which the character string has been inserted are reproduced on terminal 102-1 under conditions appropriate to terminal 102-1.

Fifth Embodiment

Figure 19:
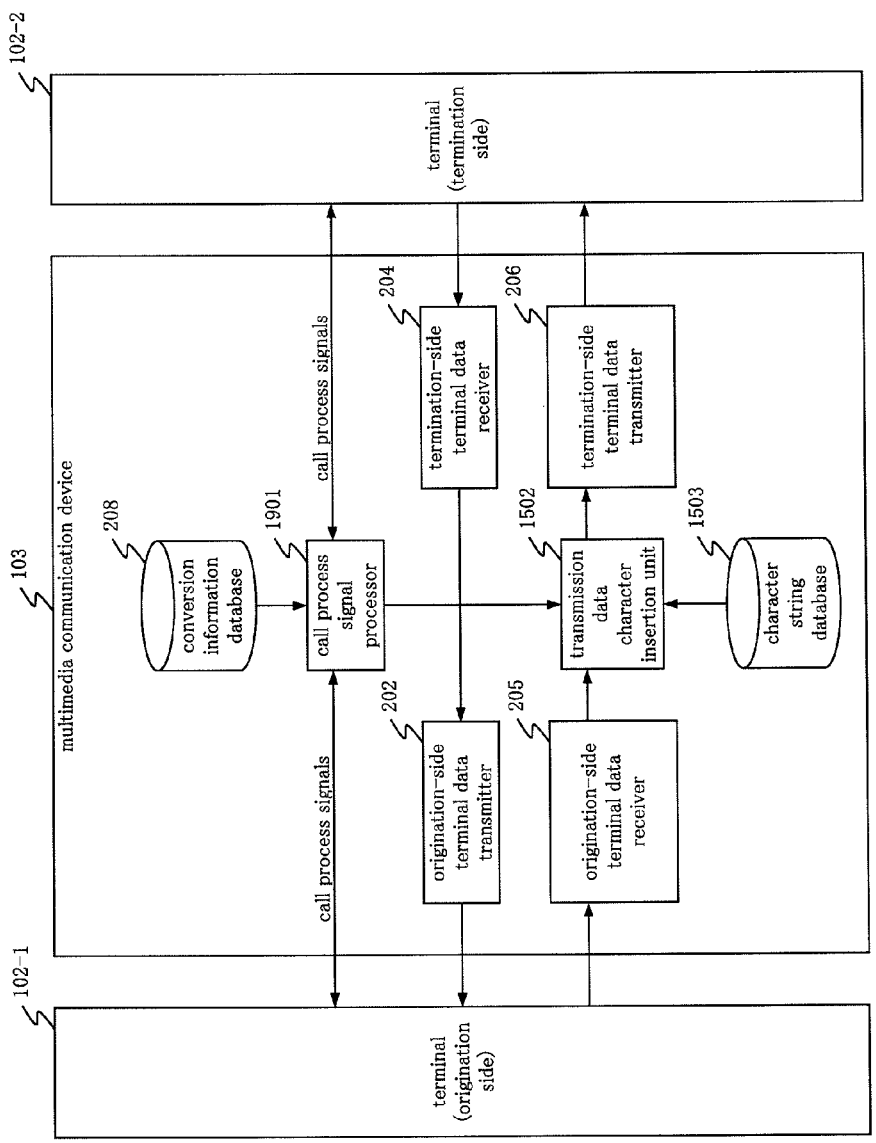
FIG. 19 shows the fifth embodiment of the multimedia communication device shown in FIG. 1.

FIG. 19 shows the fifth embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described hereinbelow regardless of which terminals are the origination-side terminal or the termination-side terminal.

As shown in FIG. 19, the fifth embodiment of multimedia communication device 103 shown in FIG. 1 is made up from: call process signal processor 1901, origination-side terminal data transmitter 202, termination-side terminal data receiver 204, origination-side terminal data receiver 205, termination-side terminal data transmitter 206, transmission data character insertion unit 1502, and character string database 1503.

Call process signal processor 1901 carries out the transmission and reception of call process signals between terminal 102-1 and terminal 102-2. Call process signal processor 1901 further issues instructions to transmission data character insertion unit 1502 to read a character string from character string database 1503 at a prescribed time or at the timing of reception of call process signals from terminal 102-1 or terminal 102-2. Call process signal processor 1901 further issues instructions to transmission data character insertion unit 1502 to insert the character string that has been read from character string database 1503 into encoded data that are to be transmitted to terminal 102-2 at a prescribed time or at the timing of reception of call process signals from terminal 102-1 or terminal 102-2. Call process signal processor 1901 is capable of using, for example, SIP of the IETF standard as call process signals.

Origination-side terminal data transmitter 202 transmits encoded data that have been supplied from termination-side terminal data receiver 204 to terminal 102-1. The processes in origination-side terminal data transmitter 202 are the same as the processes in origination-side terminal data transmitter 202 in the first to fourth embodiments.

Termination-side terminal data receiver 204 receives encoded data that have been transmitted from terminal 102-2 and supplies the encoded data that have been received to origination-side terminal data transmitter 202. The processes in termination-side terminal data receiver 204 are the same as the processes in termination-side terminal data receiver 204 in the first to fourth embodiments.

Origination-side terminal data receiver 205 receives encoded data that have been transmitted from terminal 102-1 and supplies the encoded data to transmission data character insertion unit 1502. The processes in origination-side terminal data receiver 205 are the same as the processes in origination-side terminal data receiver 205 in the first to fourth embodiments.

Termination-side terminal data transmitter 206 transmits encoded data that have been supplied from transmission data character insertion unit 1502 to terminal 102-2. The processes in termination-side terminal data transmitter 206 are the same as the processes in termination-side terminal data transmitter 206 in the first to fourth embodiments.

Conversion information database 208 is the same as in the first to fourth embodiments.

In accordance with instructions from call process signal processor 1901, transmission data character insertion unit 1502 reads a character string from character string database 1503 and inserts the character string that has been read into encoded data that have been supplied from origination-side terminal data receiver 205. Transmission data character insertion unit 1502 then supplies the encoded data into which the character string has been inserted to termination-side terminal data transmitter 206. The insertion of a character string is to superimpose the character string on encoded data (images) that have been supplied from origination-side terminal data receiver 205. Regarding the method of synthesis, a method is employed that is used in the related art. The processes in transmission data character insertion unit 1502 are the same as the processes in transmission data character insertion unit 1502 in the fourth embodiment.

Character string database 1503 is the same as in the fourth embodiment.

Explanation next regards the multimedia communication method in multimedia communication device 103 shown in FIG. 19.

Figure 20:
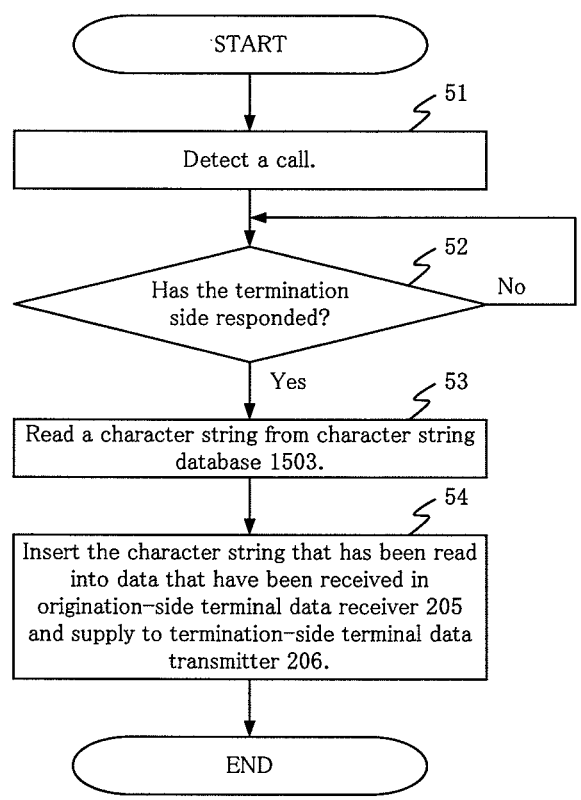
FIG. 20 is a flow chart for explaining the multimedia communication method in the multimedia communication device shown in FIG. 19.

FIG. 20 is a flow chart for explaining the multimedia communication method in multimedia communication device 103 shown in FIG. 19.

First, upon detecting in Step 51 the call origination from terminal 102-1 to terminal 102-2 shown in FIG. 19, call process signal processor 1901 determines whether or not terminal 102-2 that is the termination-side terminal has responded in Step 52.

If call process signal processor 1901 determines that terminal 102-2 has responded, call process signal processor 1901 issues instructions to transmission data character insertion unit 1502 to read a character string from character string database 1503 and to insert the character string that has been read into encoded data that have been supplied from origination-side terminal data receiver 205. In accordance with these instructions, a character string is read from character string database 1503 by transmission data character insertion unit 1502 in Step 53.

The character string that is read at this time may be a character string that is selected in accordance with the termination-side terminal, as in the fourth embodiment. Alternatively, a character string may be selected and read in accordance with the origination-side terminal. The character string that is read at this time is a character string that can be displayed on terminal 102-2.

The character string that has been read is then inserted into encoded data that have been supplied from origination-side terminal data receiver 205, and the encoded data into which the character string has been inserted are supplied to termination-side terminal data transmitter 206 in Step 54. The position at which character string is inserted in the encoded data that have been supplied from origination-side terminal data receiver 205 is arbitrary and a position may be selected in advance, or a position may be designated from terminal 102-1. When attribute information of the character string has been stored in character string database 1503, the character string may be inserted based on the attribute information of the character string.

The encoded data are then transmitted from termination-side terminal data transmitter 206 to terminal 102-2, and the encoded data into which the character string has been inserted are reproduced on terminal 102-2.

When encoded data are transmitted to terminal 102-2, the encoded data may be converted in data converter 303 shown in FIG. 3 as in the first to fourth embodiments.

When a call is carried out from terminal 102-1 to terminal 102-2 in the present embodiment as described hereinabove, a prescribed character string is inserted into the encoded data that are transmitted from terminal 102-1 to terminal 102-2 and the encoded data into which the character string has been inserted are reproduced on terminal 102-2 under conditions appropriate to terminal 102-2.

Sixth Embodiment

Multimedia communication device 103 that is provided with both the functions of the fourth embodiment and the functions of the fifth embodiment that are described hereinabove can also be considered.

Figure 21:
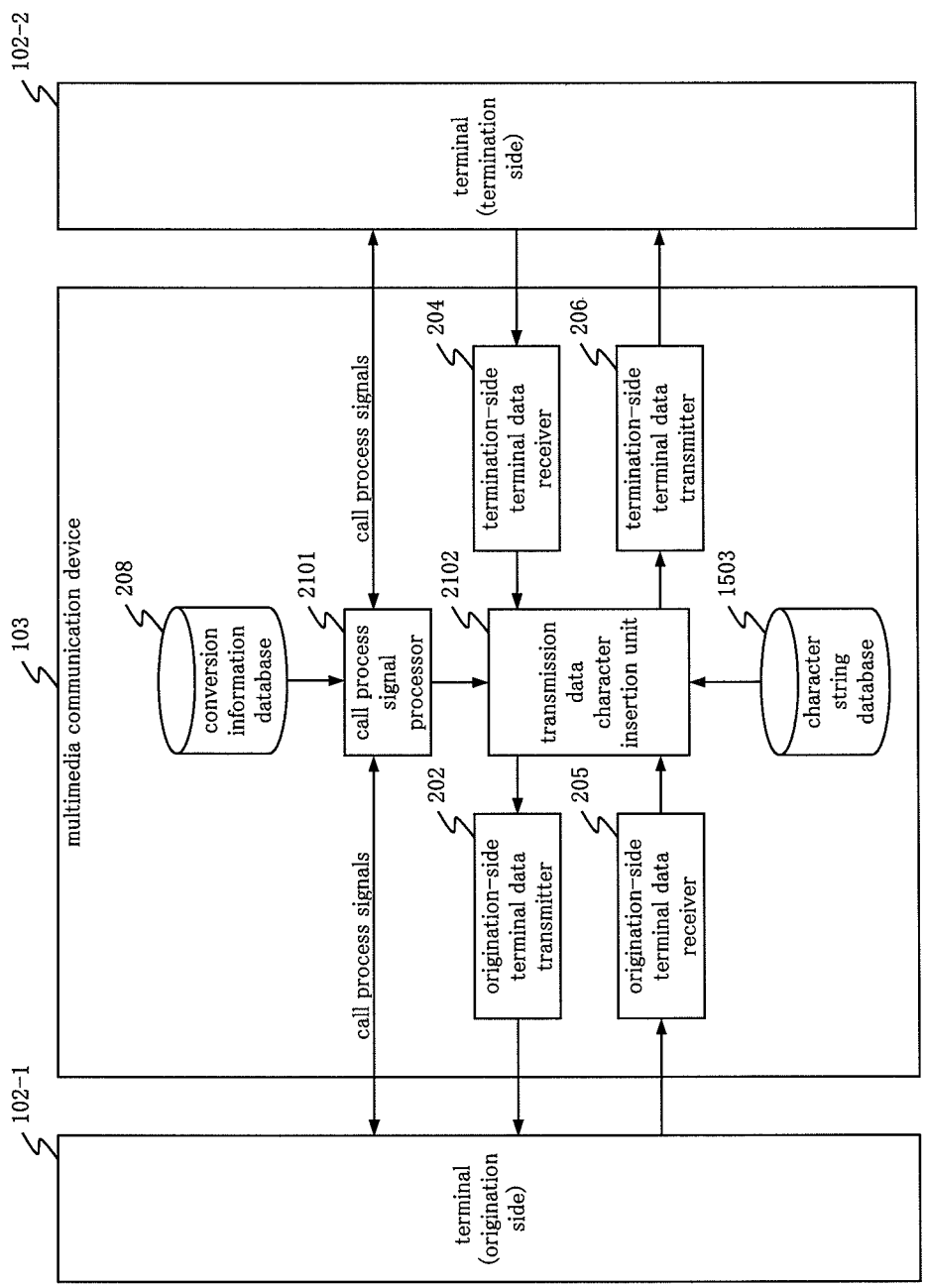
FIG. 21 shows the sixth embodiment of the multimedia communication device shown in FIG. 1.

FIG. 21 shows the sixth embodiment of multimedia communication device 103 shown in FIG. 1. An example is here described in which communication takes place between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described below regardless of which of terminals 102-3-102-n is the origination-side terminal or the termination-side terminal.

As shown in FIG. 21, the sixth embodiment of multimedia communication device 103 shown in FIG. 1 is made up from: call process signal processor 2101, origination-side terminal data transmitter 202, termination-side terminal data receiver 204, origination-side terminal data receiver 205, termination-side terminal data transmitter 206, transmission data character insertion unit 2102, and character string database 1503.

Call process signal processor 2101 carries out transmission and reception of call process signals between terminal 102-1 and terminal 102-2. Call process signal processor 2101 further issues instructions to transmission data character insertion unit 2102 to read a character string from character string database 1503 at a prescribed time or at the timing of reception of call process signals from terminal 102-1 or terminal 102-2. Call process signal processor 2101 further issues instructions to transmission data character insertion unit 2102 to insert the character string that has been read from character string database 1503 into the encoded data that are to be transmitted to terminals 102-1-102-2 at a prescribed time or at the timing of reception of call process signals from terminal 102-1 or terminal 102-2. Call process signal processor 2101 is capable of using, for example, SIP of the IETF standard as call process signals.

Origination-side terminal data transmitter 202 transmits encoded data that have been supplied from transmission data character insertion unit 2102 to terminal 102-1. The processes in origination-side terminal data transmitter 202 are the same as the processes in origination-side terminal data transmitter 202 in the first to fifth embodiments.

Termination-side terminal data receiver 204 receives encoded data that have been transmitted from terminal 102-2 and supplies the encoded data that have been received to transmission data character insertion unit 2102. The processes in termination-side terminal data receiver 204 are the same as the processes in termination-side terminal data receiver 204 in the first to fifth embodiments.

Origination-side terminal data receiver 205 receives encoded data that have been transmitted from terminal 102-1 and supplies the encoded data to transmission data character insertion unit 2102. The processes in origination-side terminal data receiver 205 are the same as the processes in origination-side terminal data receiver 205 in the first to fifth embodiments.

Termination-side terminal data transmitter 206 transmits encoded data that have been supplied from transmission data character insertion unit 2102 to terminal 102-2. The processes in termination-side terminal data transmitter 206 are the same as the processes in termination-side terminal data transmitter 206 of the first to fifth embodiments.

Conversion information database 208 is the same as in the first to fifth embodiments.

In accordance with instructions from call process signal processor 2101, transmission data character insertion unit 2102 reads a character string from character string database 1503 and inserts the character string that has been read into encoded data that have been supplied from origination-side terminal data receiver 205. Transmission data character insertion unit 2102 then supplies the encoded data into which the character string has been inserted to termination-side terminal data transmitter 206. Transmission data character insertion unit 2102 further, in accordance with instructions from call process signal processor 2101, inserts the character string that has been read into encoded data that have been supplied from termination-side terminal data receiver 204, and then supplies the encoded data into which the character string has been inserted to origination-side terminal data transmitter 202. Here, the insertion of a character string is to superimpose the character string on encoded data (images) that have been supplied from termination-side terminal data receiver 204 or origination-side terminal data receiver 205. The method of synthesis employs a method used in the related art. Transmission data character insertion unit 2102 is of a form in which transmission data character insertion unit 1502 in the fourth and fifth embodiments is provided with the two data directions: the data direction from the originator terminal to the terminator terminal and the data direction from the terminator terminal to the originator terminal.

Character string database 1503 is the same as in the fourth and fifth embodiments.

By means of this form, multimedia communication device 103, that is provided with both the functions of the fourth embodiment and the functions of the fifth embodiment, can be realized.

Seventh Embodiment

Figure 22:
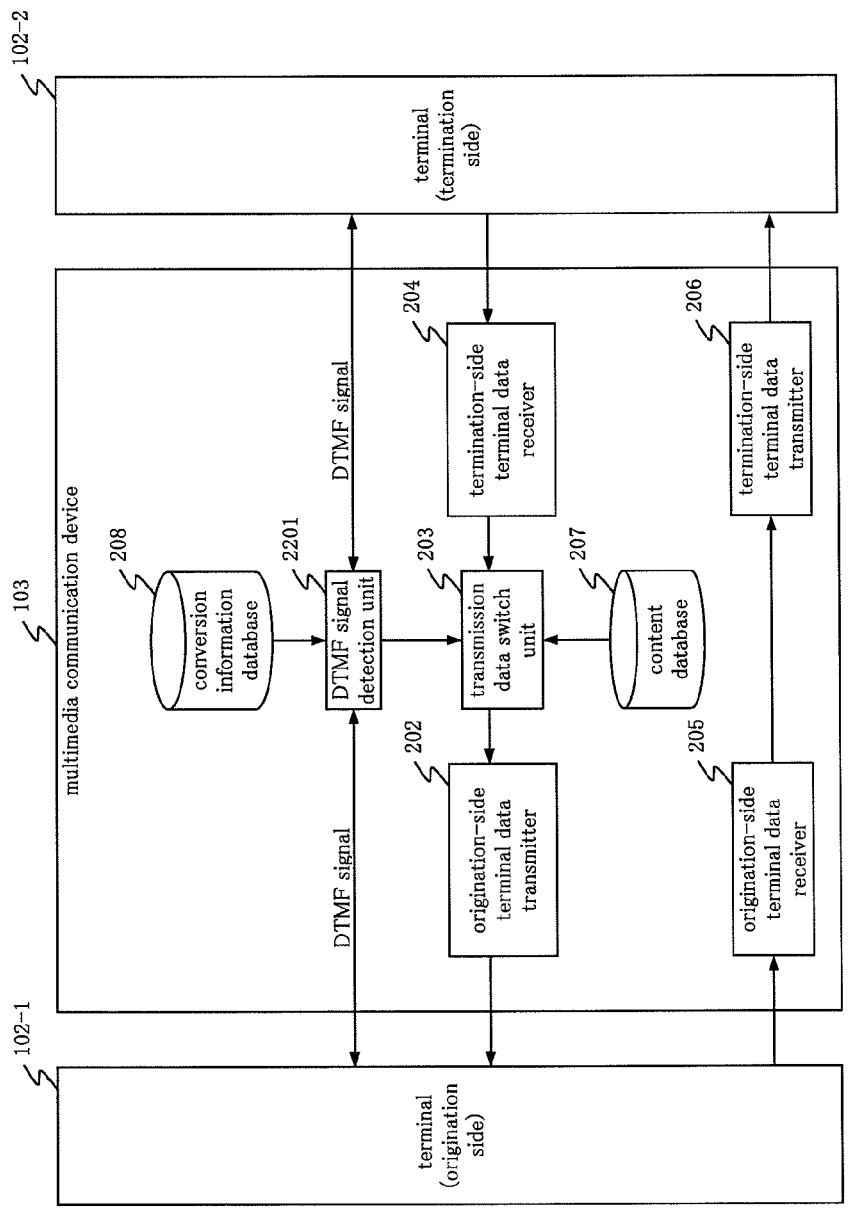
FIG. 22 shows the seventh embodiment of the multimedia communication device shown in FIG. 1.

FIG. 22 shows the seventh embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described below regardless of which of terminals 102-3-102-n is the origination-side terminal or the termination-side terminal.

As shown in FIG. 22, the seventh embodiment of multimedia communication device 103 shown in FIG. 1 is composed of: DTMF signal detection unit 2201, origination-side terminal data transmitter 202, transmission data switch unit 203, termination-side terminal data receiver 204, origination-side terminal data receiver 205, termination-side terminal data transmitter 206, and content database 207.

DTMF signal detection unit 2201 detects a read signal that is transmitted from terminals 102-1-102-2. Here, a DTMF (Dual-Tone Multi-Frequency) signal is used as the read signal. In accordance with the detected DTMF signal, DTMF signal detection unit 2201 issues instructions to transmission data switch unit 203 to read content from content database 207. Further, in accordance with the detected DTMF signal, DTMF signal detection unit 2201 issues instructions to transmission data switch unit 203 to transmit content that has been read from content database 207 to terminal 102-1. Alternatively, in accordance with the detected DTMF signal, DTMF signal detection unit 2201 issues instructions to transmission data switch unit 203 to transmit the encoded data that have been transmitted from terminal 102-2 and received in multimedia communication device 103 to terminal 102-1. In addition, DTMF signal detection unit 2201 can also be configured as a DTMF signal packet (RFC2833 and RFC4733) receiver when, for example, network 101 is a packet-switched network.

Origination-side terminal data transmitter 202 transmits the encoded data that have been supplied from transmission data switch unit 203 to terminal 102-1. The processes in origination-side terminal data transmitter 202 are the same as the processes in origination-side terminal data transmitter 202 in the first to sixth embodiments.

In accordance with instructions from DTMF signal detection unit 2201, transmission data switch unit 203 reads content from content database 207 and encodes the content. Transmission data switch unit 203 also, in accordance with instructions from DTMF signal detection unit 2201, switches the encoded data that are to be supplied to origination-side terminal data transmitter 202 to either the encoded data of content that has been read from content database 207 and has been encoded or encoded data that have been supplied from termination-side terminal data receiver 204 (encoded data that have been transmitted from terminal 102-2). The processes in transmission data switch unit 203 are the same as the processes in transmission data switch unit 203 in the first embodiment.

Termination-side terminal data receiver 204 receives encoded data that have been transmitted from terminal 102-2 and supplies the encoded data that have been received to transmission data switch unit 203. The processes in termination-side terminal data receiver 204 are the same as the processes in termination-side terminal data receiver 204 in the first to sixth embodiments.

Origination-side terminal data receiver 205 receives the encoded data that have been transmitted from terminal 102-1 and supplies the encoded data to termination-side terminal data transmitter 206. The processes in origination-side terminal data receiver 205 are the same as the processes in origination-side terminal data receiver 205 in the first to sixth embodiments.

Termination-side terminal data transmitter 206 transmits the encoded data that have been supplied from origination-side terminal data receiver 205 to terminal 102-2. The processes in termination-side terminal data transmitter 206 are the same as the processes in termination-side terminal data transmitter 206 in the first to sixth embodiments.

Content database 207 is the same as in the first to third embodiments.

Conversion information database 208 is the same as in the first to sixth embodiments.

Explanation next regards the multimedia communication method in the multimedia communication device 103 shown in FIG. 22.

Figure 23:
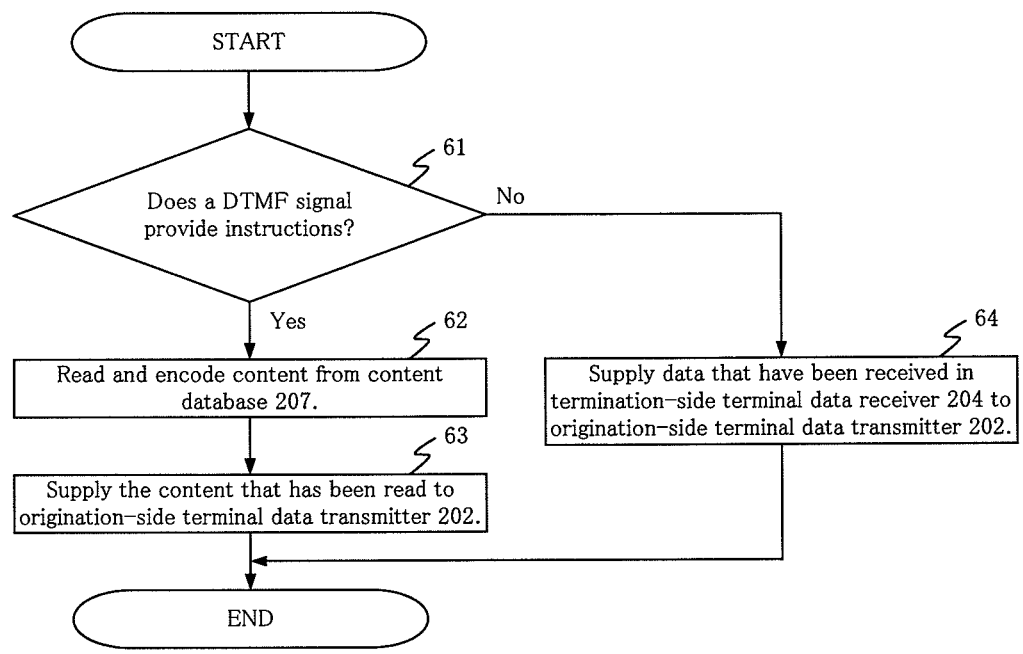
FIG. 23 is a flow chart for explaining the multimedia communication method in the multimedia communication device shown in FIG. 22.

FIG. 23 is a flow chart for explaining the multimedia communication method in multimedia communication device 103 shown in FIG. 22.

First, prescribed instructions realized by a DTMF signal from terminal 102-1 or terminal 102-2 are detected in DTMF signal detection unit 2201 in Step 61. The content of these instructions is set in advance, and the input of prescribed keys of terminal 102-1 or terminal 102-2 by a user causes a DTMF signal that corresponds to the input keys to be transmitted from terminal 102-1 or terminal 102-2. The DTMF signal transmitted from terminal 102-1 or terminal 102-2 is then detected in DTMF signal detection unit 2201.

When the prescribed instructions realized by the DTMF signal from terminal 102-1 or terminal 102-2 are detected in DTMF signal detection unit 2201, instructions are issued from DTMF signal detection unit 2201 to transmission data switch unit 203 to read content from content database 207 and encode the content to supply the encoded data to origination-side terminal data transmitter 202. In accordance with these instructions, content is read from content database 207 and encoded by transmission data switch unit 203 in Step 62, and the encoded data of the encoded content are supplied to origination-side terminal data transmitter 202 in Step 63.

The encoded data of the content are then transmitted from origination-side terminal data transmitter 202 to terminal 102-1.

On the other hand, when prescribed instructions according to a DTMF signal from terminal 102-1 or terminal 102-2 are not detected in DTMF signal detection unit 2201, instructions are issued from DTMF signal detection unit 2201 to transmission data switch unit 203 to supply encoded data that have been supplied from termination-side terminal data receiver 204 to origination-side terminal data transmitter 202. In accordance with these instructions, encoded data that have been supplied from termination-side terminal data receiver 204 are supplied from transmission data switch unit 203 to origination-side terminal data transmitter 202 in Step 64.

The encoded data are then transmitted from origination-side terminal data transmitter 202 to terminal 102-1 and reproduced on terminal 102-1.

Differences in data formats that can be reproduced on each terminal of terminals 102-1-102-n can also be considered. As a result, when the encoded data are to be transmitted to origination-side terminal data transmitter 202, instructions may be issued from DTMF signal detection unit 2201 to transmission data switch unit 203 to convert the encoded data that are to be transmitted to a data format that can be decoded and reproduced on terminals 102-1-102-n that are the transmission destinations. In this case, the actual data conversion is carried out in data converter 303 of transmission data switch unit 203 shown in FIG. 3.

When the above-described instructions from DTMF signal detection unit 2201 are implemented, the conversion information in terminal 102-1 that is to reproduce the encoded data are read from conversion information database 208 by DTMF signal detection unit 2201. This conversion information has been placed in correspondence with the identification number of terminal 102-1 that is contained in the call process signals received in DTMF signal detection unit 2201. The conversion information that is read is supplied from DTMF signal detection unit 2201 to transmission data switch unit 203. Data conversion is then carried out in data converter 303 in transmission data switch unit 203 for the encoded data that are to be supplied from transmission data switch unit 203 based on the conversion information, whereby encoded data that have been converted to a data format that can be decoded and reproduced in terminal 102-1 are transmitted from origination-side terminal data transmitter 202 to terminal 102-1. This data conversion process is the same as shown in the first embodiment.

In this way, a prescribed DTMF signal is transmitted from terminal 102-1 or terminal 102-2, whereby encoded data that are transmitted from multimedia communication device 103 to terminal 102-1 in accordance with the DTMF signal can be switched to either content that is read from content database 207 or encoded data that have been transmitted from terminal 102-2.

Eighth Embodiment

Figure 24:
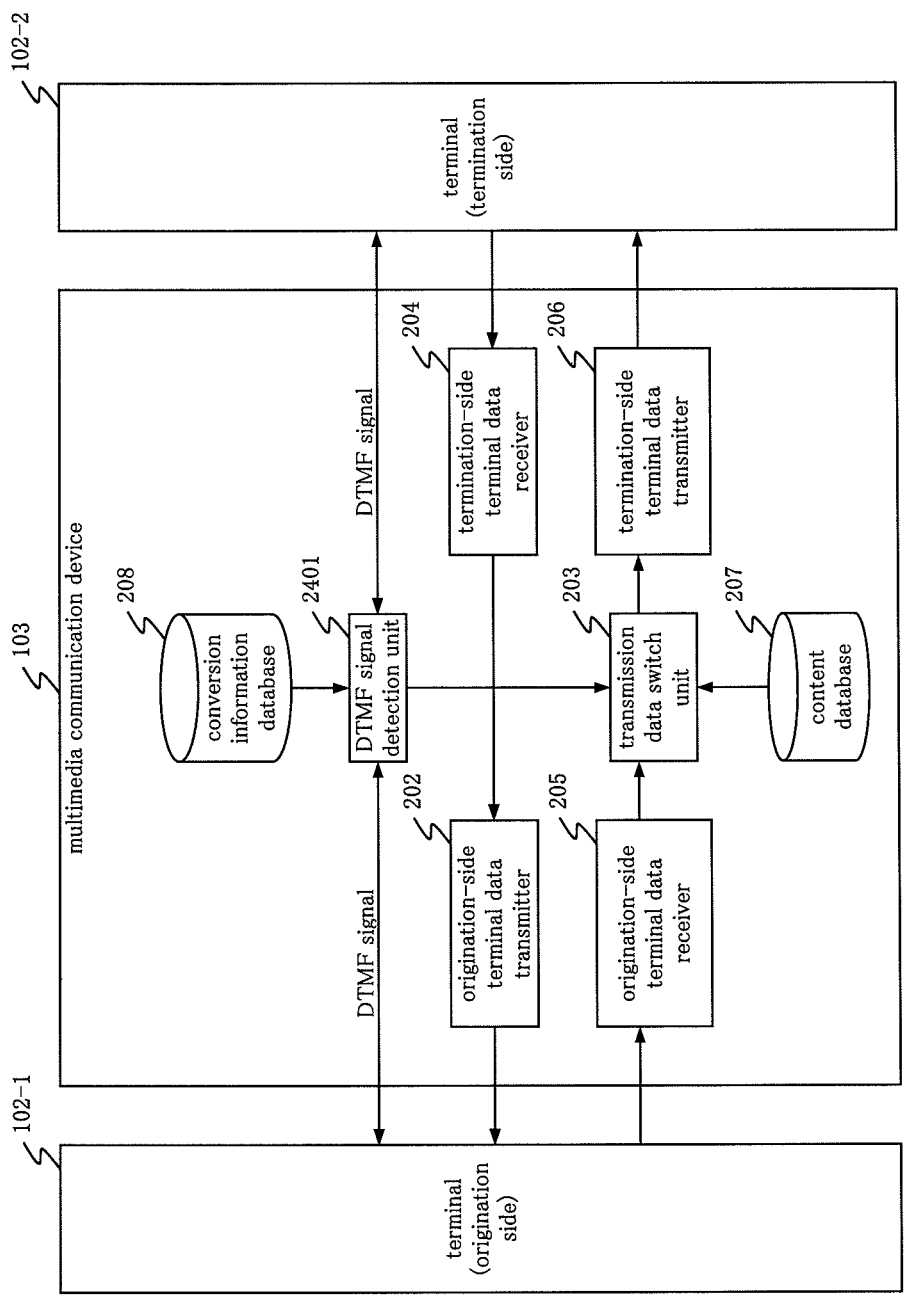
FIG. 24 shows the eighth embodiment of the multimedia communication device shown in FIG. 1.

FIG. 24 shows the eighth embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described below regardless of which of terminals 102-3-102-n is the origination-side terminal or the termination-side terminal.

As shown in FIG. 24, the eighth embodiment of multimedia communication device 103 shown in FIG. 1 is made up from: DTMF signal detection unit 2401, origination-side terminal data transmitter 202, transmission data switch unit 203, termination-side terminal data receiver 204, origination-side terminal data receiver 205, termination-side terminal data transmitter 206, and content database 207.

DTMF signal detection unit 2401 detects read signals transmitted from terminals 102-1-102-2. Here, DTMF signals are used as the read signals. In accordance with DTMF signals that are detected, DTMF signal detection unit 2401 issues instructions to transmission data switch unit 203 to read content from content database 207. DTMF signal detection unit 2401 further, in accordance with the DTMF signal that has been detected, issues instructions to transmission data switch unit 203 to transmit content that has been read from content database 207 to terminal 102-2, or to transmit encoded data that have been transmitted from terminal 102-1 and received in multimedia communication device 103 to terminal 102-2. In addition, DTMF signal detection unit 2401 can also be configured as a DTMF signal packet (RFC2833, RFC4733) receiver when, for example, network 101 is a packet-switched network.

Origination-side terminal data transmitter 202 transmits encoded data that have been supplied from termination-side terminal data receiver 204 to terminal 102-1. The processes in origination-side terminal data transmitter 202 are the same as the processes in origination-side terminal data transmitter 202 in the first to seventh embodiments.

In accordance with instructions from DTMF signal detection unit 2401, transmission data switch unit 203 reads content from content database 207 and encodes the content. Transmission data switch unit 203 further, in accordance with instructions from DTMF signal detection unit 2401, switches the encoded data that are to be supplied to termination-side terminal data transmitter 206 to either encoded data of content that has been read from content database 207 and has been encoded or encoded data that have been supplied from origination-side terminal data receiver 205 (encoded data that have been transmitted from terminal 102-1). The processes in transmission data switch unit 203 are the same as the processes in transmission data switch unit 203 in the second embodiment.

Termination-side terminal data receiver 204 receives encoded data that have been transmitted from terminal 102-2 and supplies the encoded data that have been received to origination-side terminal data transmitter 202. The processes in termination-side terminal data receiver 204 are the same as the processes in termination-side terminal data receiver 204 in the first to seventh embodiments.

Origination-side terminal data receiver 205 receives the encoded data that have been transmitted from terminal 102-1 and supplies the encoded data to transmission data switch unit 203. The processes in origination-side terminal data receiver 205 are the same as the processes in origination-side terminal data receiver 205 in the first to seventh embodiments.

Termination-side terminal data transmitter 206 transmits the encoded data that have been supplied from transmission data switch unit 203 to terminal 102-2. The processes in termination-side terminal data transmitter 206 are the same as the processes in termination-side terminal data transmitter 206 in the first to seventh embodiments.

Content database 207 is the same as in the seventh embodiment.

Conversion information database 208 is the same as in the first to seventh embodiments.

Explanation next regards the multimedia communication method in multimedia communication device 103 shown in FIG. 24.

Figure 25:
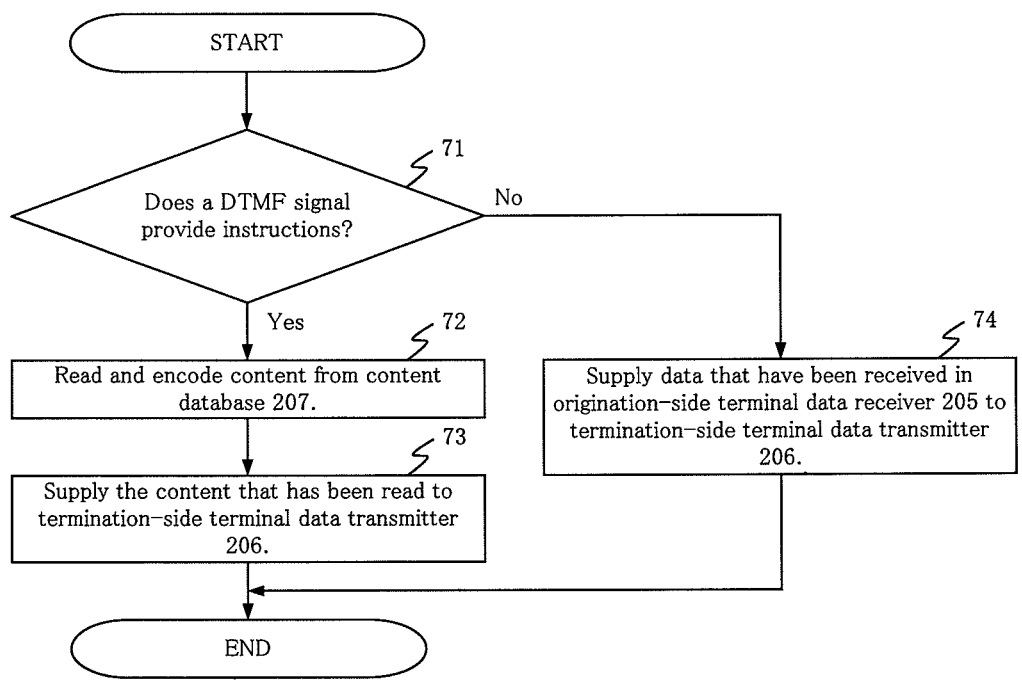
FIG. 25 is a flow chart for explaining the multimedia communication method in the multimedia communication device shown in FIG. 24.

FIG. 25 is a flow chart for explaining the multimedia communication method in multimedia communication device 103 shown in FIG. 24.

Prescribed instructions resulting from a DTMF signal from terminal 102-1 or terminal 102-2 are first detected in DTMF signal detection unit 2401 in Step 71. The content of these instructions is set in advance, and the input of prescribed keys of terminal 102-1 or terminal 102-2 by a user causes a DTMF signal that corresponds to the input keys to be transmitted from terminal 102-1 or terminal 102-2. The DTMF signal transmitted from terminal 102-1 or terminal 102-2 is then detected in DTMF signal detection unit 2401.

When a prescribed instruction resulting from a DTMF signal from terminal 102-1 or terminal 102-2 is detected in DTMF signal detection unit 2401, instructions are issued from DTMF signal detection unit 2401 to transmission data switch unit 203 to read content from content database 207 and encode the content and to supply the data to termination-side terminal data transmitter 206. In accordance with these instructions, transmission data switch unit 203 reads content from content database 207 and encodes the content in Step 72, and supplies the encoded data of the encoded content to termination-side terminal data transmitter 206 in Step 73.

The encoded data of the content are then transmitted from termination-side terminal data transmitter 206 to terminal 102-2.

On the other hand, when a prescribed instruction realized by a DTMF signal from terminal 102-1 or terminal 102-2 is not detected in DTMF signal detection unit 2401, instructions are issued from DTMF signal detection unit 2401 to transmission data switch unit 203 to supply the encoded data supplied from origination-side terminal data receiver 205 to termination-side terminal data transmitter 206. In accordance with these instructions, transmission data switch unit 203 supplies the encoded data that have been supplied from origination-side terminal data receiver 205 to termination-side terminal data transmitter 206 in Step 74.

The encoded data are then transmitted from termination-side terminal data transmitter 206 to terminal 102-2 and reproduced on terminal 102-2.

Differences of the data format that can be reproduced on each terminal of terminals 102-1-102-n can also be considered. As a result, a configuration is also possible in which instructions are issued from DTMF signal detection unit 2401 to transmission data switch unit 203 such that, when encoded data are transmitted to termination-side terminal data transmitter 206, the encoded data that are transmitted are converted to a data format that can be decoded and reproduced in terminals 102-1-102-n that are the transmission destinations and then supplied. In this case, the actual data conversion is carried out in data converter 303 of transmission data switch unit 203 shown in FIG. 3.

When the above-described instructions are issued from DTMF signal detection unit 2401, conversion information in terminal 102-2 that is to reproduce the encoded data is read from conversion information database 208 by DTMF signal detection unit 2401. This conversion information is placed in correspondence with the identification number of terminal 102-2 that is contained in the call process signals received in DTMF signal detection unit 2401. The conversion information that is read is supplied from DTMF signal detection unit 2401 to transmission data switch unit 203. Data conversion is then carried out in data converter 303 in transmission data switch unit 203 for the encoded data that have been supplied from transmission data switch unit 203 based on the conversion information, whereby encoded data that have been converted to a data format that can be decoded and reproduced on terminal 102-2 are transmitted from termination-side terminal data transmitter 206 to terminal 102-2. These data conversion processes are the same as shown in the first embodiment.

In this way, a prescribed DTMF signal is transmitted from terminal 102-1 or terminal 102-2, whereby encoded data that are to be transmitted from multimedia communication device 103 to terminal 102-2 can be switched to either content that is read from content database 207 or encoded data that have been transmitted from terminal 102-1 in accordance with the DTMF signal.

Ninth Embodiment

Multimedia communication device 103, that is provided with both the capabilities of the seventh embodiment and the capabilities of the eighth embodiment described hereinabove, can also be considered.

Figure 26:
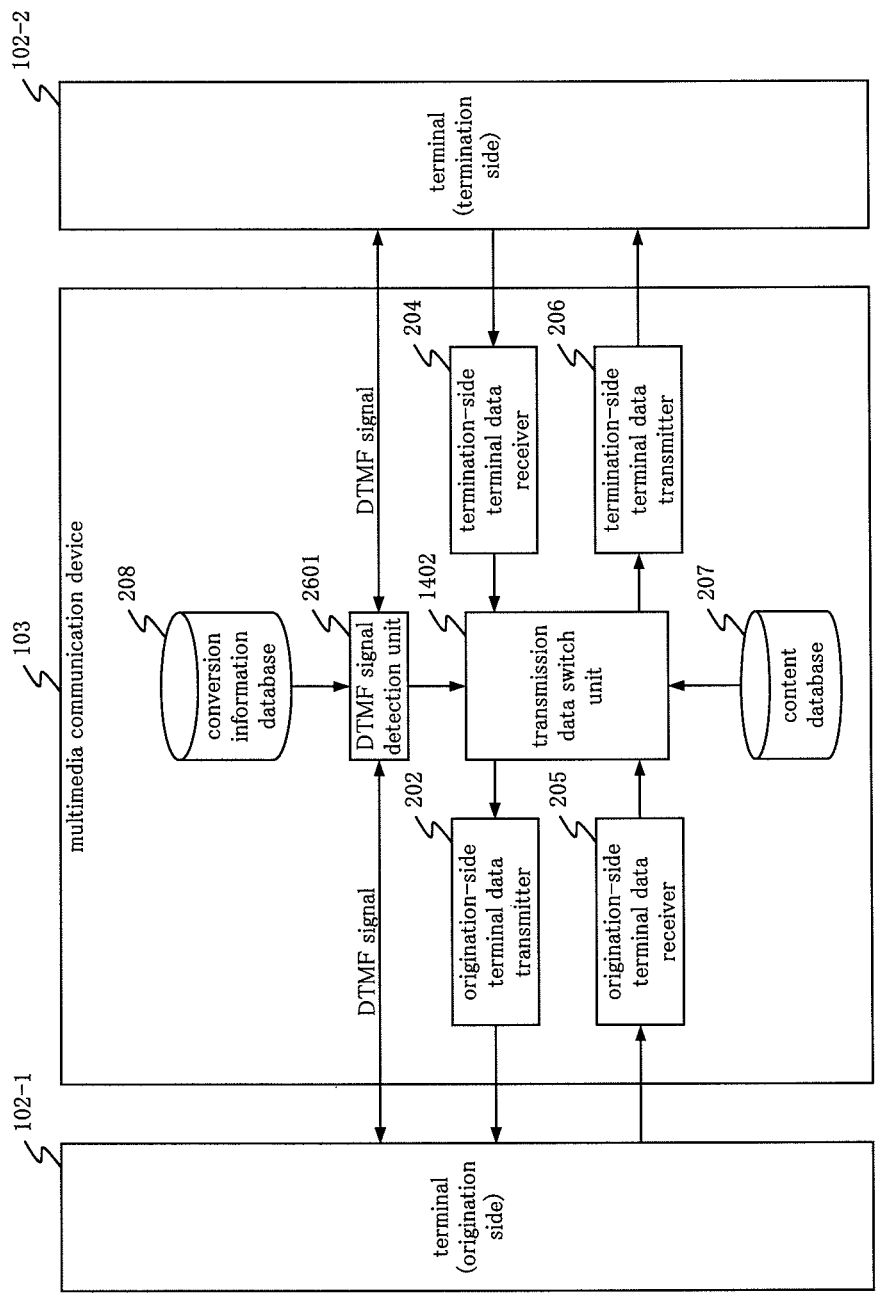
FIG. 26 shows the ninth embodiment of the multimedia communication device shown in FIG. 1.

FIG. 26 shows the ninth embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described below regardless of which of terminals 102-3-102-n is the origination-side terminal or the termination-side terminal.

As shown in FIG. 26, the ninth embodiment of multimedia communication device 103 shown in FIG. 1 is composed of: DTMF signal detection unit 2601, origination-side terminal data transmitter 202, termination-side terminal data receiver 204, origination-side terminal data receiver 205, termination-side terminal data transmitter 206, content database 207, and transmission data switch unit 1402.

DTMF signal detection unit 2601 detects a read signal that has been transmitted from terminals 102-1-102-2. Here, a DTMF signal is used as the read signal. In addition, in accordance with the detected DTMF signal, DTMF signal detection unit 2601 issues instructions to transmission data switch unit 1402 to read content from content database 207. DTMF signal detection unit 2601 further, in accordance with the detected DTMF signal, issues instructions to transmission data switch unit 1402 to transmit content that has been read from content database 207 to terminal 102-2. Alternatively, DTMF signal detection unit 2601, in accordance with a detected DTMF signal, issues instructions to transmission data switch unit 1402 to transmit encoded data that have been transmitted from terminal 102-1 and received in multimedia communication device 103 to terminal 102-2. DTMF signal detection unit 2601 further, in accordance with the detected DTMF signal, issues instructions to transmission data switch unit 1402 to transmit the content that has been read from content database 207 to terminal 102-1. Alternatively, DTMF signal detection unit 2601, in accordance with the detected DTMF signal, issues instructions to transmission data switch unit 1402 to transmit encoded data that have been transmitted from terminal 102-2 and received in multimedia communication device 103 to terminal 102-1. DTMF signal detection unit 2601 can also be configured as a DTMF signal packet (RFC2833, RFC4733) receiver when, for example, network 101 is a packet-switched network.

Origination-side terminal data transmitter 202 transmits encoded data that have been supplied from transmission data switch unit 1402 to terminal 102-1. The processes in origination-side terminal data transmitter 202 are the same as the processes in origination-side terminal data transmitter 202 in the first to eighth embodiments.

Termination-side terminal data receiver 204 receives encoded data that have been transmitted from terminal 102-2 and supplies the received encoded data to transmission data switch unit 1402. The processes in termination-side terminal data receiver 204 are the same as the processes in termination-side terminal data receiver 204 in the first to eighth embodiments.

Origination-side terminal data receiver 205 receives encoded data that have been transmitted from terminal 102-1 and supplies the encoded data to transmission data switch unit 1402. The processes in origination-side terminal data receiver 205 are the same as the processes in origination-side terminal data receiver 205 in the first to eighth embodiments.

Termination-side terminal data transmitter 206 transmits encoded data that have been supplied from transmission data switch unit 1402 to terminal 102-2. The processes in termination-side terminal data transmitter 206 are the same as the processes in termination-side terminal data transmitter 206 in the first to eighth embodiments.

Content database 207 is the same as in the seventh embodiment.

Conversion information database 208 is the same as in the first to eighth embodiments.

Transmission data switch unit 1402 reads content from content database 207 and encodes the content in accordance with instructions from DTMF signal detection unit 2601. Transmission data switch unit 1402 further, in accordance with instructions from DTMF signal detection unit 2601, switches encoded data that are to be supplied to termination-side terminal data transmitter 206 to either encoded data of content that has been read from content database 207 and has been encoded or encoded data that have been supplied from origination-side terminal data receiver 205 (encoded data that have been transmitted from terminal 102-1). In addition, transmission data switch unit 1402, in accordance with instructions from DTMF signal detection unit 2601, switches encoded data that are to supplied to origination-side terminal data transmitter 202 to either encoded data of content that has been read from content database 207 and has been encoded or encoded data that have been supplied from termination-side terminal data receiver 204 (encoded data that have been transmitted from terminal 102-2). The processes in transmission data switch unit 1402 are the same as the processes in transmission data switch unit 1402 in the third embodiment.

This form enables the realization of multimedia communication device 103 that is provided with both the capabilities of the seventh embodiment and the capabilities of the eighth embodiment.

Tenth Embodiment

Figure 27:
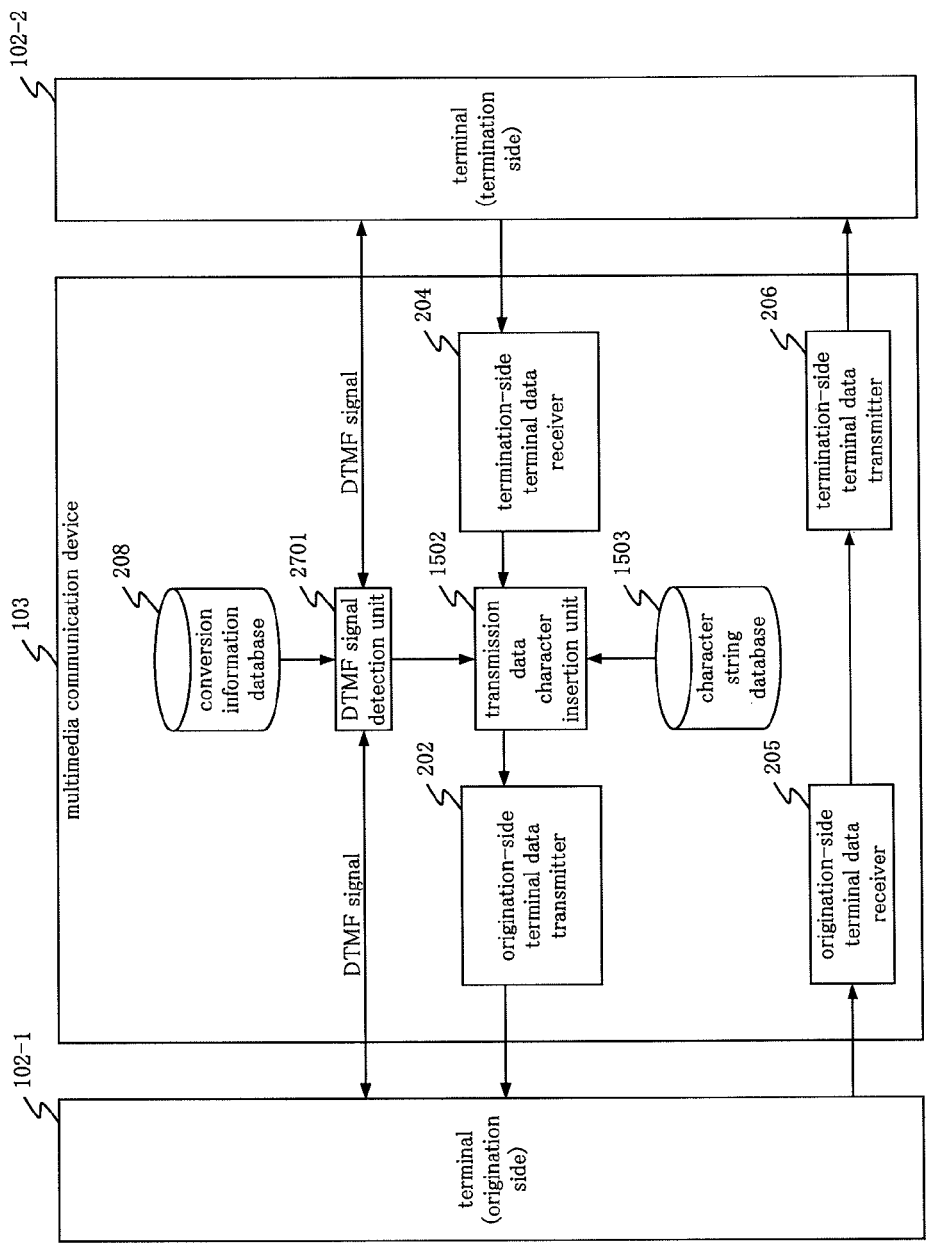
FIG. 27 shows the tenth embodiment of the multimedia communication device shown in FIG. 1.

FIG. 27 shows the tenth embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described hereinbelow regardless of which of terminals 102-3-102-n is the origination-side terminal or the termination-side terminal.

As shown in FIG. 27, the tenth embodiment of multimedia communication device 103 shown in FIG. 1 is composed of: DTMF signal detection unit 2701, origination-side terminal data transmitter 202, termination-side terminal data receiver 204, origination-side terminal data receiver 205, termination-side terminal data transmitter 206, transmission data character insertion unit 1502, and character string database 1503.

DTMF signal detection unit 2701 detects a read signal transmitted from terminal 102-1-102-2. Here, DTMF signals are used as the read signals. In accordance with a DTMF signal that has been detected, DTMF signal detection unit 2701 issues instructions to transmission data character insertion unit 1502 to read a character string from character string database 1503. In addition, in accordance with a DTMF signal that has been detected, DTMF signal detection unit 2701 issues instructions to transmission data character insertion unit 1502 to insert the character string that has been read from character string database 1503 into encoded data that are to be transmitted to terminal 102-1. DTMF signal detection unit 2701 can also be configured as a DTMF signal packet (RFC2833, RFC4733) receiver when, for example, network 101 is a packet-switched network.

Origination-side terminal data transmitter 202 transmits encoded data that have been supplied from transmission data character insertion unit 1502 to terminal 102-1. The processes in origination-side terminal data transmitter 202 are the same as the processes in origination-side terminal data transmitter 202 in the first to ninth embodiments.

Termination-side terminal data receiver 204 receives encoded data that have been transmitted from terminal 102-2 and supplies the encoded data that have been received to transmission data character insertion unit 1502. The processes in termination-side terminal data receiver 204 are the same as the processes in termination-side terminal data receiver 204 of the first to ninth embodiments.

Origination-side terminal data receiver 205 receives encoded data that have been transmitted from terminal 102-1 and supplies the encoded data to termination-side terminal data transmitter 206. The processes in origination-side terminal data receiver 205 are the same as the processes in origination-side terminal data receiver 205 in the first to ninth embodiments.

Termination-side terminal data transmitter 206 transmits encoded data that have been supplied from origination-side terminal data receiver 205 to terminal 102-2. The processes in termination-side terminal data transmitter 206 are the same as the processes in termination-side terminal data transmitter 206 in the first to ninth embodiments.

Conversion information database 208 is the same as in the first to ninth embodiments.

Transmission data character insertion unit 1502, in accordance with instructions from DTMF signal detection unit 2701, reads a character string from character string database 1503 and inserts the character string that has been read into encoded data that have been supplied from termination-side terminal data receiver 204. Transmission data character insertion unit 1502 then supplies the encoded data into which the character string has been inserted to origination-side terminal data transmitter 202. In this case, the insertion of the character string is to superimpose the character string on encoded data (images) that have been supplied from termination-side terminal data receiver 204. The method of synthesis employs a method used in the related art. The processes in transmission data character insertion unit 1502 are the same as processes in transmission data character insertion unit 1502 in the fourth embodiment.

Character string database 1503 is the same as in the fourth to sixth embodiments.

Explanation next regards the multimedia communication method in multimedia communication device 103 shown in FIG. 27.

Figure 28:
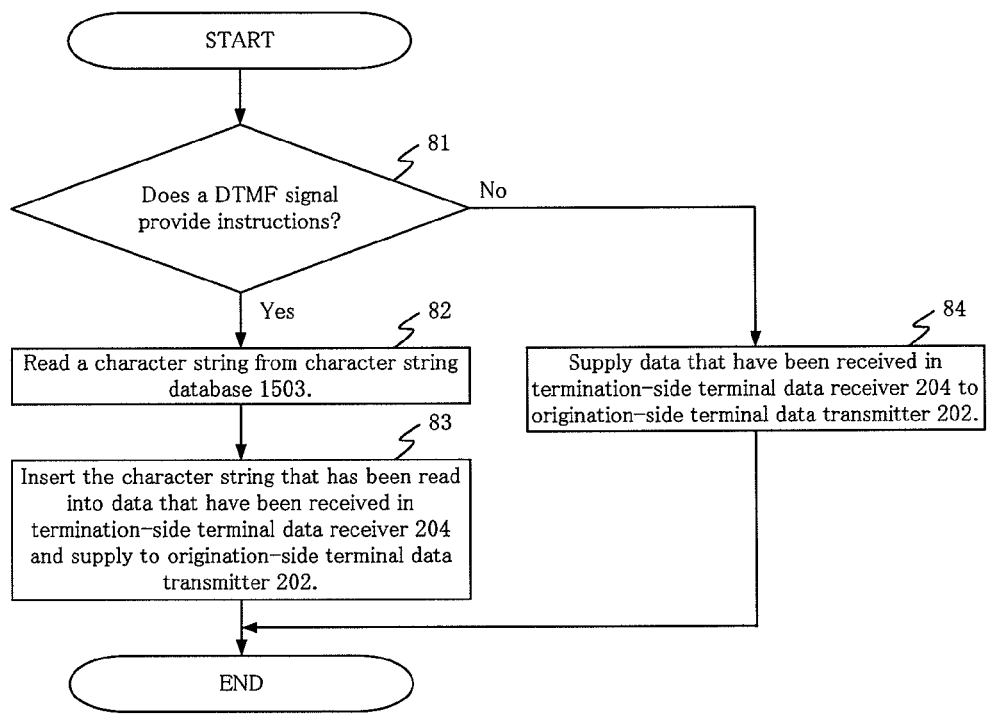
FIG. 28 is a flow chart for explaining the multimedia communication method in the multimedia communication device shown in FIG. 27.

FIG. 28 is a flow chart for explaining the multimedia communication method in multimedia communication device 103 shown in FIG. 27.

First, a prescribed instruction resulting from a DTMF signal from terminal 102-1 or terminal 102-2 is detected in DTMF signal detection unit 2701 in Step 81. The content of this instruction is set in advance, and a user performs input of prescribed keys in terminal 102-1 or terminal 102-2 to transmit a DTMF signal that corresponds to the key input from terminal 102-1 or terminal 102-2. The DTMF signal transmitted from terminal 102-1 or terminal 102-2 is detected in DTMF signal detection unit 2701.

When a prescribed instruction resulting from a DTMF signal from terminal 102-1 or terminal 102-2 is detected in DTMF signal detection unit 2701, instructions are issued from DTMF signal detection unit 2701 to transmission data character insertion unit 1502 to read a character string from character string database 1503 and to insert the character string that has been read into encoded data that have been supplied from termination-side terminal data receiver 204. In accordance with this instruction, a character string is read from character string database 1503 by transmission data character insertion unit 1502 in Step 82. The character string that is read at this time is a character string that can be displayed on terminal 102-1. The character string that has been read is inserted into encoded data that have been supplied from termination-side terminal data receiver 204, and the encoded data into which the character string has been inserted is supplied to origination-side terminal data transmitter 202 in Step 83. The character string is inserted at any position in the encoded data that have been supplied from termination-side terminal data receiver 204, and this position may be predetermined or may be a position that is designated by terminal 102-1 or terminal 102-2. If attribute information of the character string is stored in character string database 1503, the character string may be inserted based on the attribute information of the character string.

The encoded data are then transmitted from origination-side terminal data transmitter 202 to terminal 102-1.

On the other hand, when a prescribed instruction resulting from a DTMF signal from terminal 102-1 or terminal 102-2 is not detected in DTMF signal detection unit 2701, instructions are issued from DTMF signal detection unit 2701 to transmission data character insertion unit 1502 to supply encoded data that have been supplied from termination-side terminal data receiver 204 to origination-side terminal data transmitter 202 without alteration. In accordance with these instructions, encoded data that have been supplied from termination-side terminal data receiver 204 are supplied to origination-side terminal data transmitter 202 in Step 84 from transmission data character insertion unit 1502.

These encoded data are then transmitted from origination-side terminal data transmitter 202 to terminal 102-1, and the encoded data into which a character string has been inserted are reproduced on terminal 102-1.

When encoded data are transmitted to terminal 102-1, the encoded data may be converted in data converter 303 shown in FIG. 3 as in the first to ninth embodiments.

In this way, a prescribed DTMF signal is transmitted from terminal 102-1 or terminal 102-2, whereby, in accordance with the DTMF signal, a character string that has been read from character string database 1503 can be inserted into encoded data that are to be transmitted from multimedia communication device 103 to terminal 102-1.

In the present embodiment described hereinabove, a prescribed DTMF signal is transmitted from terminal 102-1 or terminal 102-2, whereby a prescribed character string is inserted into encoded data that are to transmitted to terminal 102-1 from terminal 102-2, and the encoded data into which the character string has been inserted is reproduced on terminal 102-1 under conditions appropriate to terminal 102-1.

Eleventh Embodiment

Figure 29:
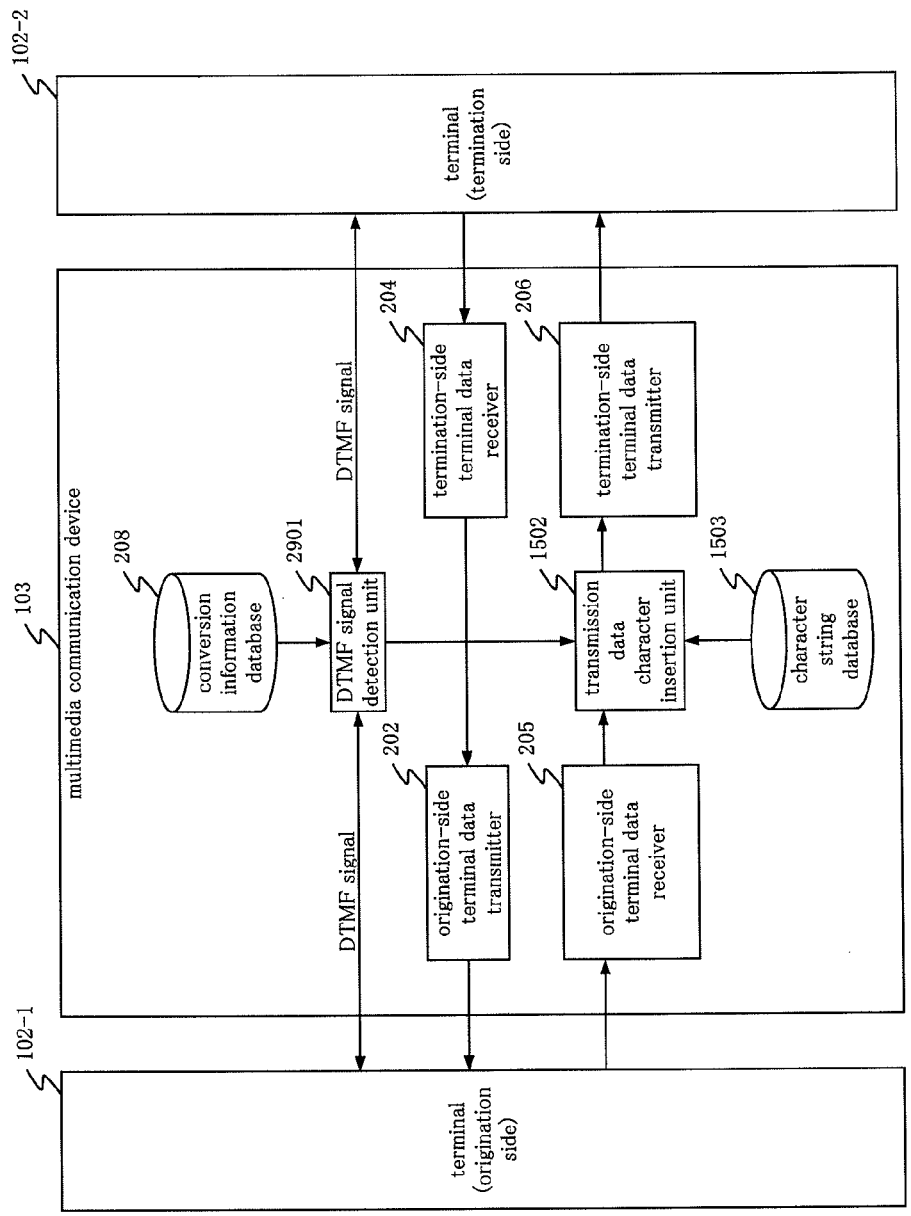
FIG. 29 shows the eleventh embodiment of the multimedia communication device shown in FIG. 1.

FIG. 29 shows the eleventh embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of terminals 102-3-102-n are the same as described hereinbelow regardless of which of terminals 102-3-102-n is the origination-side terminal or the termination-side terminal.

As shown in FIG. 29, the eleventh embodiment of multimedia communication device 103 shown in FIG. 1 is made up from: DTMF signal detection unit 2901, origination-side terminal data transmitter 202, termination-side terminal data receiver 204, origination-side terminal data receiver 205, termination-side terminal data transmitter 206, transmission data character insertion unit 1502, and character string database 1503.

DTMF signal detection unit 2901 detects a read signal transmitted from terminals 102-1-102-2. Here, a DTMF signal is used as the read signal. Further, DTMF signal detection unit 2901, in accordance with the DTMF signal that is detected, issues instructions to transmission data character insertion unit 1502 to read a character string from character string database 1503. DTMF signal detection unit 2901 further, in accordance with a detected DTMF signal, issues instructions to transmission data character insertion unit 1502 to insert a character string that has been read from character string database 1503 into encoded data that are to be transmitted to terminal 102-2. DTMF signal detection unit 2901 can also be configured as a DTMF signal packet (RFC2833, RFC4733) receiver when, for example, network 101 is a packet-switched network.

Origination-side terminal data transmitter 202 transmits encoded data that have been supplied from termination-side terminal data receiver 204 to terminal 102-1. The processes in origination-side terminal data transmitter 202 are the same as the processes in origination-side terminal data transmitter 202 in the first to tenth embodiments.

Termination-side terminal data receiver 204 receives encoded data that have been transmitted from terminal 102-2 and supplies the received encoded data to origination-side terminal data transmitter 202. The processes in termination-side terminal data receiver 204 are the same as the processes in termination-side terminal data receiver 204 in the first to tenth embodiments.

Origination-side terminal data receiver 205 receives encoded data that have been transmitted from terminal 102-1 and supplies the encoded data to transmission data character insertion unit 1502. The processes in origination-side terminal data receiver 205 are the same as the processes in origination-side terminal data receiver 205 in the first to tenth embodiments.

Termination-side terminal data transmitter 206 transmits encoded data that have been supplied from transmission data character insertion unit 1502 to terminal 102-2. The processes in termination-side terminal data transmitter 206 are the same as the processes in termination-side terminal data transmitter 206 in the first to tenth embodiments.

Conversion information database 208 is the same as in the first to tenth embodiments.

Transmission data character insertion unit 1502, in accordance with instructions from DTMF signal detection unit 2901, reads a character string from character string database 1503 and inserts the character string that has been read into encoded data that have been supplied from origination-side terminal data receiver 205. Transmission data character insertion unit 1502 then supplies the encoded data into which the character string has been inserted to termination-side terminal data transmitter 206. The insertion of the character string in this case is to superimpose the character string on encoded data (images) that have been supplied from origination-side terminal data receiver 205. The synthesis method employs a method used in the related art. The processes in transmission data character insertion unit 1502 are the same as the processes in transmission data character insertion unit 1502 in the fifth embodiment.

Character string database 1503 is the same as in the fourth to sixth embodiments.

Explanation next regards the multimedia communication method in multimedia communication device 103 shown in FIG. 29.

Figure 30:
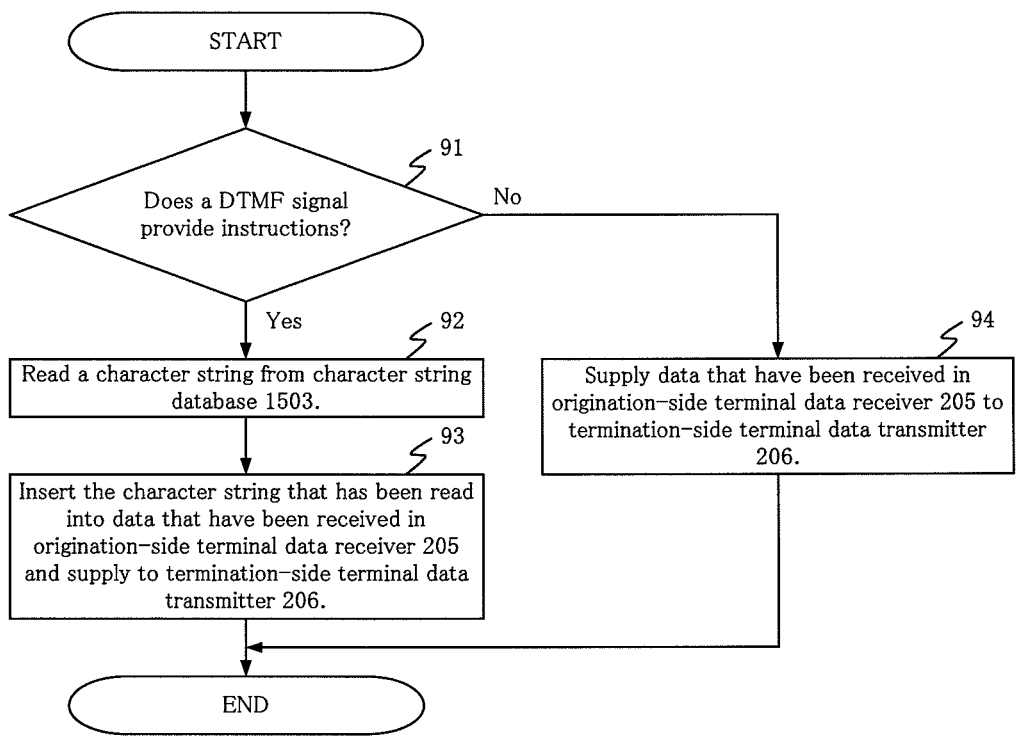
FIG. 30 is a flow chart for explaining the multimedia communication method in the multimedia communication device shown in FIG. 29.

FIG. 30 is a flow chart for explaining the multimedia communication method in multimedia communication device 103 shown in FIG. 29.

A prescribed instruction by means of a DTMF signal from terminal 102-1 or terminal 102-2 is detected in DTMF signal detection unit 2901 in Step 91. The content of this instruction is set in advance, and a user, by applying input inputted by prescribed keys into terminal 102-1 or into terminal 102-2, transmits a DTMF signal that corresponds to the key input from terminal 102-1 or terminal 102-2. The DTMF signal transmitted from terminal 102-1 or terminal 102-2 is then detected in DTMF signal detection unit 2901.

When a prescribed instruction resulting from a DTMF signal from terminal 102-1 or terminal 102-2 is detected in DTMF signal detection unit 2901, instructions are issued from DTMF signal detection unit 2901 to transmission data character insertion unit 1502 to read a character string from character string database 1503 and insert the character string that has been read into encoded data that have been supplied from origination-side terminal data receiver 205. In accordance with these instructions, a character string is read from character string database 1503 by transmission data character insertion unit 1502 in Step 92. The character string that is read at this time is a character string that can be displayed on terminal 102-2. The character string that has been read is inserted into encoded data that have been supplied from origination-side terminal data receiver 205, and the encoded data into which the character string has been inserted are supplied to termination-side terminal data transmitter 206 in Step 93. The character string can be inserted at any position of the encoded data that have been supplied from origination-side terminal data receiver 205, and this position may be a predetermined position or a position depending on instructions from terminal 102-1 or terminal 102-2. Alternatively, when attribute information of the character string is stored in character string database 1503, the character string may be inserted based on the attribute information of the character string.

The encoded data are then transmitted from termination-side terminal data transmitter 206 to terminal 102-2.

On the other hand, when a prescribed instruction resulting from a DTMF signal from terminal 102-1 or terminal 102-2 is not detected in DTMF signal detection unit 2901, instructions are issued from DTMF signal detection unit 2901 to transmission data character insertion unit 1502 to supply encoded data that have been supplied from origination-side terminal data receiver 205 without alteration to termination-side terminal data transmitter 206. In accordance with these instructions, transmission data character insertion unit 1502 supplies encoded data that have been supplied from origination-side terminal data receiver 205 to termination-side terminal data transmitter 206 in Step 94.

The encoded data are then transmitted from termination-side terminal data transmitter 206 to terminal 102-2, and encoded data into which a character string has been inserted are reproduced on terminal 102-2.

When transmitting encoded data to terminal 102-2, the encoded data may be converted in data converter 303 shown in FIG. 3 as in the first to tenth embodiments.

In this way, a prescribed DTMF signal is transmitted from terminal 102-1 or terminal 102-2, whereby, in accordance with the DTMF signal, a character string that is read from character string database 1503 can be inserted into encoded data that are to be transmitted from multimedia communication device 103 to terminal 102-2.

In the present embodiment as described hereinabove, the transmission of a prescribed DTMF signal from terminal 102-1 or terminal 102-2 causes a prescribed character string to be inserted into encoded data that are to transmitted from terminal 102-1 to terminal 102-2 and causes the encoded data into which the character string has been inserted to be reproduced on terminal 102-2 under conditions appropriate to terminal 102-2.

Twelfth Embodiment

A multimedia communication device 103, that is provided with both the capabilities of the tenth embodiment and the capabilities of the eleventh embodiment described hereinabove, can also be considered.

Figure 31:
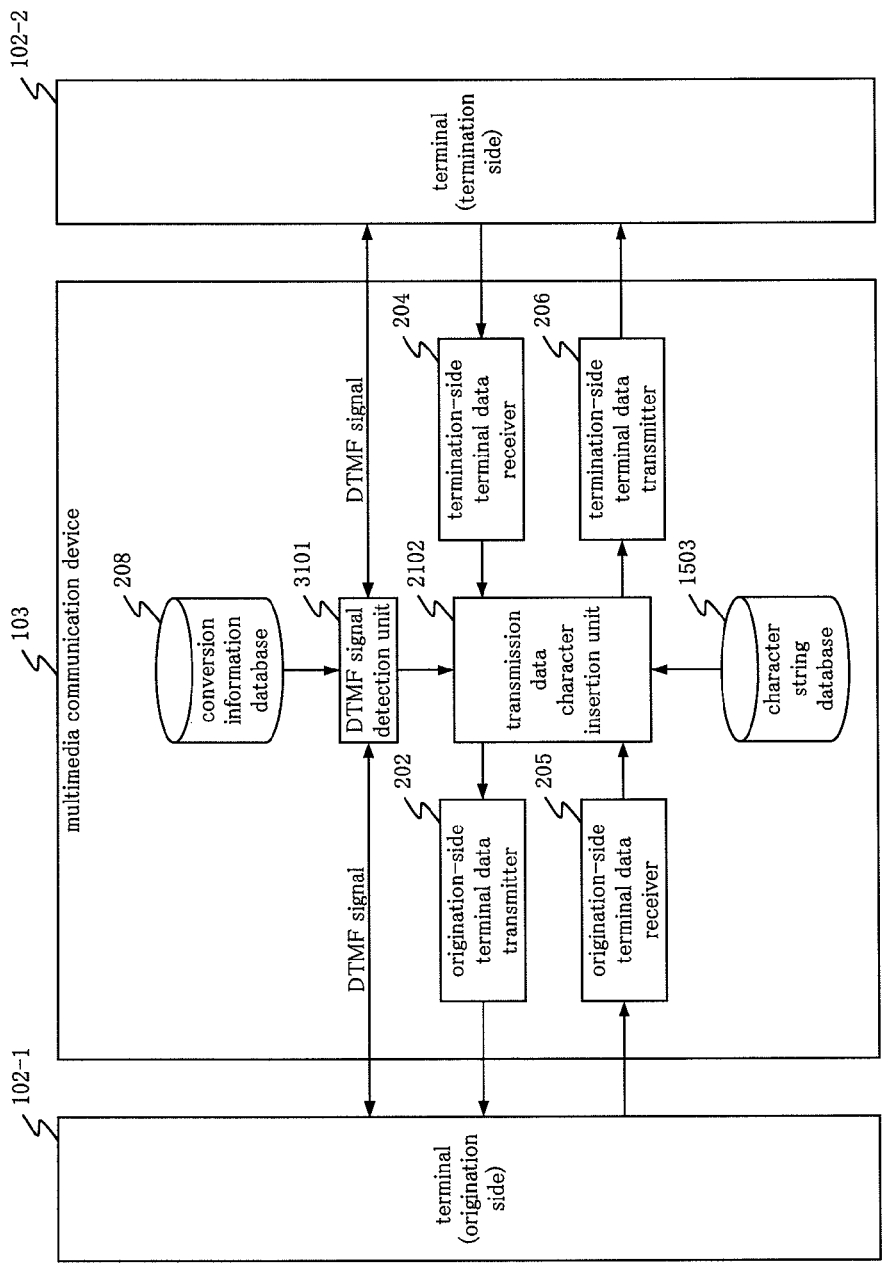
FIG. 31 shows the twelfth embodiment of the multimedia communication device shown in FIG. 1.

FIG. 31 shows the twelfth embodiment of multimedia communication device 103 shown in FIG. 1. An example is here described in which communication is carried out between terminal 102-1 and terminal 102-2. Terminal 102-1 is the origination-side terminal, and terminal 102-2 is the termination-side terminal that is the communication partner of terminal 102-1. The operations of each of terminals 102-3-102-n are the same as described below regardless of which of terminals 102-3-102-n is the origination-side terminal or the termination-side terminal.

As shown in FIG. 31, the twelfth embodiment of multimedia communication device 103 shown in FIG. 1 is made up from: DTMF signal detection unit 3101, origination-side terminal data transmitter 202, termination-side terminal data receiver 204, origination-side terminal data receiver 205, termination-side terminal data transmitter 206, transmission data character insertion unit 2102, and character string database 1503.

DTMF signal detection unit 3101 detects a read signal that is transmitted from terminals 102-1-102-2. Here, a DTMF signal is used as the read signal. In accordance with the detected DTMF signal, DTMF signal detection unit 3101 issues instructions to transmission data character insertion unit 2102 to read a character string from character string database 1503. Further, in accordance with the detected DTMF signal, DTMF signal detection unit 3101 issues instructions to transmission data character insertion unit 2102 to insert the character string that has been read from character string database 1503 into encoded data that are to be transmitted to terminal 102-2. In addition, in accordance with the detected DTMF signal, DTMF signal detection unit 3101 issues instructions to transmission data character insertion unit 2102 to insert the character string that has been read from character string database 1503 into encoded data that are to be transmitted to terminal 102-1. DTMF signal detection unit 3101 can be configured as a DTMF signal packet (RFC2833, RFC4733) receiver when, for example, network 101 is a packet-switched network.

Origination-side terminal data transmitter 202 transmits encoded data that have been supplied from transmission data character insertion unit 2102 to terminal 102-1. The processes in origination-side terminal data transmitter 202 are the same as the processes in origination-side terminal data transmitter 202 of the first to eleventh embodiments.

Termination-side terminal data receiver 204 receives encoded data that have been transmitted from terminal 102-2 and supplies the encoded data that have been received to transmission data character insertion unit 2102. The processes in termination-side terminal data receiver 204 are the same as the processes in termination-side terminal data receiver 204 in the first to eleventh embodiments.

Origination-side terminal data receiver 205 receives encoded data that have been transmitted from terminal 102-1 and supplies the encoded data to transmission data character insertion unit 2102. The processes in origination-side terminal data receiver 205 are the same as the processes in origination-side terminal data receiver 205 in the first to eleventh embodiments.

Termination-side terminal data transmitter 206 transmits encoded data that have been supplied from transmission data character insertion unit 2102 to terminal 102-2. The processes in termination-side terminal data transmitter 206 are the same as the processes in termination-side terminal data transmitter 206 in the first to eleventh embodiments.

Conversion information database 208 is the same as in the first to eleventh embodiments.

Transmission data character insertion unit 2102, in accordance with instructions from DTMF signal detection unit 3101, reads a character string from character string database 1503 and inserts the character string that has been read into encoded data that have been supplied from origination-side terminal data receiver 205. Transmission data character insertion unit 2102 then supplies the encoded data into which the character string has been inserted to termination-side terminal data transmitter 206. In addition, in accordance with instructions from DTMF signal detection unit 3101, transmission data character insertion unit 2102 reads a character string from character string database 1503 and inserts the character string that has been read into encoded data that have been supplied from termination-side terminal data receiver 204. Transmission data character insertion unit 2102 then supplies the encoded data into which the character string has been inserted to origination-side terminal data transmitter 202. The insertion of a character string in this case is to superimpose the character string on encoded data (images) that have been supplied from origination-side terminal data receiver 205 or termination-side terminal data receiver 204. The method of synthesis employs a method used in the related art. The processes in transmission data character insertion unit 2102 are the same as the processes in transmission data character insertion unit 2102 in the sixth embodiment.

Character string database 1503 is the same as in the fourth to sixth embodiments.

By means of this embodiment, multimedia communication device 103 that is provided with both the capabilities of the tenth embodiment and the capabilities of the eleventh embodiment can be realized.

Multimedia communication device 103 in the above-described first to twelfth embodiments can obviously operate as a media server for distributing content and character strings.

Thirteenth Embodiment

Multimedia communication device 103 described hereinabove can distribute advertising content to terminals 102-1-102-n as a media server.

Figures 32, 33:
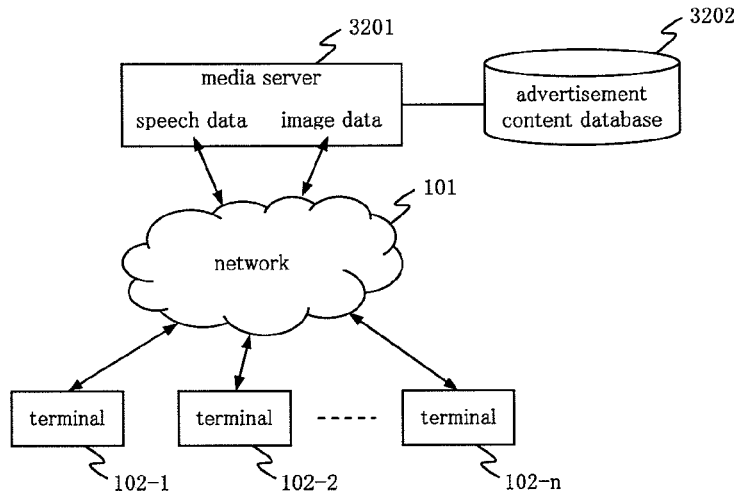
FIG. 32 shows the thirteenth embodiment of the multimedia communication device shown in FIG. 1.
FIG. 33 shows one configuration of the advertisement content database shown in FIG. 32.

FIG. 32 shows the thirteenth embodiment of multimedia communication device 103 shown in FIG. 1.

As shown in FIG. 32, media server 3201, which is a multimedia communication device, is connected to a plurality of terminals 102-1-102-n by way of network 101. Media server 3201 is further connected to advertisement content database 3202.

Terminals 102-1-102-n are communication terminals that can transmit and receive images and speech, as represented by a videophone terminal. Terminals 102-1-102-n encode, as speech data, speech that is collected by a speech collection means such as a microphone provided in terminals 102-1-102-n and transmit the encoded speech data. In addition, terminals 102-1-102-n encode, as image data, images captured by a capture means such as a camera provided in terminals 102-1-102-n and transmit the encoded image data. In addition, terminals 102-1-102-n decode speech from speech data that have been received and reproduce the decoded speech by means of a speech reproduction means such as a speaker provided in terminals 102-1-102-n. Terminals 102-1-102-n also decode images from image data that have been received and reproduce the decoded images by means of an image reproduction means such as a display that is provided in terminals 102-1-102-n.

Advertisement content database 3202 stores advertisement content that is to be distributed to terminals 102-1-102-n by way of network 101. This advertisement content may be images or may be characters.

FIG. 33 shows a construction of advertisement content database 3202 shown in FIG. 32.

As shown in FIG. 33, advertisement content database 3202 shown in FIG. 32 stores advertisement character data and advertisement images as advertisement data. An identification number that has been individually conferred to each item of data and a classification are stored in correspondence with each item of advertisement data. For example, the identification number "9001" and the classification "advertisement character data" are placed in correspondence with the advertisement data constituted by the characters "○○ Electronics." In addition, the identification number "9002" and the classification "advertisement character data" are placed in correspondence with the character advertisement data "□□ Shopping." Further, the identification number "9003" and the classification "advertisement image" are placed in correspondence with the advertisement data that is an image of a television. Still further, the identification number "9004" and the classification "advertisement image" are placed in correspondence with the advertisement data of a day trip to a hot spring. Advertisement data for which the classification is "advertisement image" may be still pictures or moving pictures.

Media server 3201 intermediates in the transfer of speech data and image data that are transmitted and received among terminals 102-1-102-n by way of network 101. In addition, media server 3201 reads advertisement content from advertisement content database 3202 and distributes the advertisement content to terminals 102-1-102-n by way of network 101. During distribution, the advertisement content that has been read from advertisement content database 3202 may be distributed to terminals 102-1-102-n without alteration. In addition, media server 3201 may also insert advertisement content that has been read from advertisement content database 3202 into images that are transmitted and received among terminals 102-1-102-n and may distribute the result. In this case, the data that are to be distributed may be converted to a data format that can be decoded and reproduced on terminals 102-1-102-n as in the above-described first to twelfth embodiments.

For example, when advertisement data for which the classification is "advertisement character data" are read from advertisement content database 3202, the advertisement data may be imposed on telephone screens in videophone communication among terminals 102-1-102-n using a transcoder. In this case, the advertisement data are displayed superposed on videophone images on the screens of terminals 102-1-102-n that are engaged in videophone conversation. In addition, when advertisement data for which the classification is "advertisement images" are read from advertisement content database 3202, the advertisement data and videophone images may be partitioned and combined in videophone calls among terminals 102-1-102-n using a transcoder. In this case, the advertisement data are displayed on a specified portion of the screens of terminals 102-1-102-n that are engaged in videophone calls, and videophone images are displayed in other prescribed portions. This imposition or partitioned-combination is carried out in transmission data character insertion unit 2102 or transmission data switch unit 1402 of multimedia communication device 103.

In addition, the items of the advertisement data that are to be superposed or partitioned and combined may be designated from terminals 102-1-102-n or may be selected at random, no particular stipulations being here imposed.

As a result, advertisement data can be combined in various formats.

In addition, the timing of the distribution of advertisement data is not limited to times when terminals 102-1-102-n are engaged in calls, but may also be when an originator terminal is calling a terminator terminal as in the first to sixth embodiments, or may be after calls of terminals 102-1-102-n end.

The configuration of media server 3201 is the same as the configuration of multimedia communication device 103 described hereinabove.

Fourteenth Embodiment

Figures 34, 35, 36:
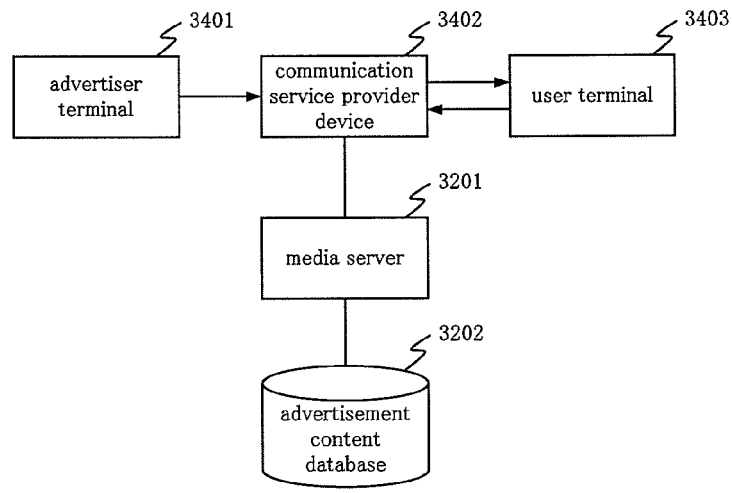
FIG. 34 shows the fourteenth embodiment of the multimedia communication device shown in FIG. 1.
FIG. 35 shows one construction of the preferential treatment information database in which the number of transmissions of advertisement data and preferential treatment information are placed in correspondence.
FIG. 36 shows one construction of the preferential treatment information database in which the transmission time of advertisement data and preferential treatment information are placed in correspondence.

FIG. 34 shows the fourteenth embodiment of multimedia communication device 103 shown in FIG. 1.

As shown in FIG. 34, the present embodiment is formed by making media server 3201, which is multimedia communication device 103, connectible to communication service provider device 3402, which belongs to a communication service provider with whom the user who owns user terminal 3403 is contracted. In addition, media server 3201 is connected to advertisement content database 3202. Still further, communication is possible between communication service provider device 3402 and advertiser terminal 3401 that belongs to an advertiser.

The advertisement data of advertiser terminal 3401 are registered (stored) in advance in advertisement content database 3202 by advertiser terminal 3401. The advertisement data that are registered in this advertisement content database 3202 are managed by communication service provider device 3402, whereby advertiser terminal 3401 pays an advertisement fee to communication service provider device 3402.

Communication carried out by user terminal 3403 is carried out through communication service provider device 3402 and media server 3201. In this case, communication service provider device 3402 uses media server 3201 to read advertisement content from advertisement content database 3202 and provides multimedia service to user terminal 3403, in the form of advertisement content, at least any one of images, speech, or character string transmitted from media server 3201 to the origination-side terminal or termination-side terminal belonging to user terminal 3403. More specifically, communication service provider device 3402 issues instructions to media server 3201 to read advertisement data from advertisement content database 3202 and to insert this advertisement data into, or combine this advertisement data with, data that are transmitted from media server 3201. Alternatively, communication service provider device 3402 issues instructions to transmit the advertisement data without alteration. Media server 3201 then reads the advertisement data from advertisement content database 3202, inserts the advertisement data into or combines the advertisement data with the data that are transmitted from media server 3201, and transmits the data to user terminal 3403. Alternatively, advertisement data are transmitted to user terminal 3403 without alteration. These operations of media server 3201 are the same as the operations of multimedia communication device 103 in the above-described seventh to twelfth embodiments. Multimedia communication device 103 in the seventh to twelfth embodiments read data from a database in accordance with a DTMF signal transmitted from terminals 102-1-102-2, but media server 3201 in the present embodiment reads data from a database in accordance with instructions from communication service provider device 3402.

When it is recorded in communication service provider device 3402 or media server 3201 that advertisement data have been transmitted to user terminal 3403, preferential treatment such as the reduction or cancellation of call charges is accorded to user terminal 3403 to which the advertisement data have been transmitted based on this record (transmission frequency). Preferential treatment information for giving preferential treatment is stored in a preferential treatment database (not shown) that is provided in communication service provider device 3402 or media server 3201, and when user terminal 3403 is billed for call charges, this preferential treatment information may be read to adjust charges.

FIG. 35 shows the configuration of a preferential treatment database in which the number of transmissions of advertisement data and preferential treatment information are placed in correspondence.

As shown in FIG. 35, the number of transmissions of advertisement data and the preferential treatment information for these transmissions are stored in correspondence. For example, preferential treatment information for reducing call charges by ¥100 is stored for user terminal 3403 to which advertisement data have been transmitted 1-5 times. In addition, preferential treatment information for reducing call charges by ¥500 is stored for user terminal 3403 to which advertisement data have been transmitted 6-10 times.

Preferential treatment information may also be effected according to the transmission time interval of advertisement data.

FIG. 36 shows one configuration of a preferential treatment information database in which the transmission time interval of advertisement data and preferential treatment information are stored in correspondence.

As shown in FIG. 36, the transmission time intervals of advertisement data and the preferential treatment information for these cases are stored in correspondence. For example, preferential treatment information for canceling call charges for one day is stored for user terminal 3403 for which the transmission time interval of advertisement data is 1-3 minutes. In addition, preferential treatment information for canceling call charges for two days is stored for user terminal 3403 for which the transmission time interval of advertisement data is 3-10 minutes.

In this way, a user receives multimedia service provided from a communication service provider, and by viewing advertisement content, receives a benefit such as the cancellation of call charges or the reduction of call charges according to the frequency of advertisement transmission.

This preferential treatment information regarding call charges can also be applied in the above-described first to thirteenth embodiments.

In the above-described embodiments, the content or character strings can be selected from terminals 102-1-102-n. For example, desired content or character strings can be selected by applying the identification number of content or a character string shown in FIG. 4 or FIG. 17 as input to terminals 102-1-102-n. Alternatively, a configuration may be adopted in which the above-described identification numbers are placed in correspondence with respective terminals 102-1-102-n and content or character strings that have been placed in correspondence with terminals 102-1-102-n that originate or terminate calls are read and displayed. In addition, content that is stored in content database 207 and character strings that are stored in character string database 1503 are stored in advance.

The above-described first to twelfth embodiments may also be combined in any combination as necessary.

For example, the present invention may be a method of providing a multimedia service in a multimedia communication system made up from a plurality of terminals and a server, the server being connected to the plurality of terminals and to an advertisement content database in which are stored advertisement data such as advertisement character data and advertisement images, and the server processing call process signals of the plurality of terminals; the method including steps in which: the server reads advertisement character data from the advertisement content database during videophone conversation between the terminals; the server imposes the advertisement character data that were read onto a videophone screen; the server converts the syntax of the videophone screen on which the advertisement character data were imposed or converts the videophone screen on which the advertisement character data were imposed based on conversion information of at least one of: encoding method, encoding bit rate, frame rate, image size, profile, level, encoding options, encoding frame type composition, video packet size, intraframe spacing, intra-macroblock number, and quantization value that accord with reproduction in the terminals; and the server transmits the videophone screen that was converted to at least one of the terminals that are in the videophone conversation.

Alternatively, the present invention may be a method of providing a multimedia service in a multimedia communication system made up from a plurality of terminals and a server, the server being connected to the plurality of terminals and to an advertisement content database in which are stored advertisement data such as advertisement character data and advertisement images, and the server processing call process signals of the plurality of terminals; the method including steps in which: the server reads advertisement images from the advertisement content database during videophone conversation between the terminals; the server partitions and combines advertisement images that were read with videophone images; the server converts the syntax of the videophone screen in which the advertisement images and videophone images were partitioned and combined or converts the videophone screen in which the advertisement images and videophone images were partitioned and combined based on conversion information of at least one of: encoding method, encoding bit rate, frame rate, image size, profile, level, encoding options, encoding frame type composition, video packet size, intraframe spacing, intra-macroblock number, and quantization value that accord with reproduction in the terminals; and the server transmits the television screen that was converted to at least one of the terminals that are in the videophone conversation.

Finally, the method of the present invention may further include steps in which: the server records in a preferential treatment information database the frequency (the number of times or the amount of time) of transmission of a videophone screen to at least one of the terminals in videophone conversation; and the server reads from the preferential treatment information database preferential treatment information that accords with the frequency.

For example, the present invention may be a method of providing a multimedia service in a multimedia communication system made up from a plurality of terminals and a server, the server being connected to the plurality of terminals and to an advertisement content database in which are stored advertisement data such as advertisement character data and advertisement images, and the server processing call process signals of the plurality of terminals; the method including steps in which: the server reads advertisement character data from the advertisement content database during videophone conversation between the terminals; the server imposes the advertisement character data that were read onto a videophone screen; the server converts the syntax of the videophone screen on which the advertisement character data were imposed or converts the videophone screen on which the advertisement character data were imposed based on conversion information of at least one of: encoding method, encoding bit rate, frame rate, image size, profile, level, encoding options, encoding frame type composition, video packet size, intraframe spacing, intra-macroblock number, and quantization value that accord with reproduction in the terminals; and the server transmits the videophone screen that was converted to at least one of the terminals that are in the videophone conversation.

Alternatively, the present invention may be a method of providing a multimedia service in a multimedia communication system made up from a plurality of terminals and a server, the server being connected to the plurality of terminals and to an advertisement content database in which are stored advertisement data such as advertisement character data and advertisement images, and the server processing call process signals of the plurality of terminals; the method including steps in which: the server reads advertisement images from the advertisement content database during videophone conversation between the terminals; the server partitions and combines advertisement images that were read with videophone images; the server converts the syntax of the videophone screen in which the advertisement images and videophone images were partitioned and combined or converts the videophone screen in which the advertisement images and videophone images were partitioned and combined based on conversion information of at least one of: encoding method, encoding bit rate, frame rate, image size, profile, level, encoding options, encoding frame type composition, video packet size, intraframe spacing, intra-macroblock number, and quantization value that accord with reproduction in the terminals; and the server transmits the television screen that was converted to at least one of the terminals that are in the videophone conversation.

Finally, the method of the present invention may further include steps in which: the server records in a preferential treatment information database the frequency (the number of times or the amount of time) of transmission of a videophone screen to at least one of the terminals in videophone conversation; and the server reads from the preferential treatment information database preferential treatment information that accords with the frequency.

The invention of the present application was described with reference to embodiments, but the invention of the present application is not limited to the above-described embodiments. The composition and details of the invention of the present application are open to various modifications that will be clear to one skilled in the art and that are within the scope of the present invention.

This application claims priority that is based on Japanese Patent Application 2007-194407 submitted Jul. 26, 2007 and incorporates all of the disclosures of that application.

What is claimed is:

1. A multimedia communication device that is connected to a plurality of terminals and that processes call process signals of said plurality of terminals, comprising:
 a database in which content data are stored in advance;
 wherein said multimedia communication device:
  reads said content data from said database at either the timings of:
   (a) the interval from the time a call is made by a terminal, that performs call origination among said plurality of terminals, to a terminal among said plurality of terminals that is the communication partner of said terminal that performs call origination, until the terminal responds; or
   (b) after completion of conversation between said terminals; and
 transmits said content data that were read to said terminals, wherein:
  said database stores reproduction environment information that indicates the reproduction environment of said content data together with said content data; and
  said multimedia communication device, at said timing, reads said content data and said reproduction environment information from said database and transmits the content data and reproduction environment information that were read to the origination-side terminal that is said terminal that performs call origination.

2. The multimedia communication device according to claim 1, wherein said multimedia communication device transmits said content data that were read to a termination-side terminal that is the terminal that is the communication partner of said terminal that performs call origination.

3. The multimedia communication device according to claim 2, wherein said multimedia communication device, after said termination-side terminal responds, transmits data that were transmitted from an origination-side terminal that is said terminal that performs call origination to said termination-side terminal.

4. The multimedia communication device according to claim 1, wherein said multimedia communication device uses SIP for said call process signals.

5. A terminal that is connected to a multimedia communication device for transmitting content data, wherein said terminal reproduces content data that were transmitted from said multimedia communication device at either the timings of:
 (a) during the time when a call is made from that terminal to another terminal, or
 (b) after completion of a conversation between that terminal and another terminal,
wherein said terminal reproduces said content data based on reproduction environment information for indicating a reproduction environment of that content data that is transmitted together with the content data from said multimedia communication device.

6. A multimedia communication system made up from a plurality of terminals and a multimedia communication device, said multimedia communication device being connected to said plurality of terminals and processing call process signals of said plurality of terminals, wherein
 said multimedia communication device includes a database in which content data are stored in advance and reads said content data from said database at either the timings of:
  (a) the interval from the time a call is made by a terminal, that performs call origination among said plurality of terminals, to a terminal among said plurality of terminals that is the communication partner of said terminal that performs call origination, until the terminal responds; or
  (b) after conversation between said terminals is completed; and
 transmits the content data that were read to said terminals; and
 said terminals reproduce content data that are transmitted from said multimedia communication device, wherein:
 said database stores reproduction environment information that indicate the reproduction environment of said content data together with said content data;
 said multimedia communication device reads said content data and said reproduction environment information from said database at said timing, and transmits said content data that were read to an origination-side terminal that is said terminal that performs call origination; and
 said origination-side terminal reproduces content data that were transmitted from said multimedia communication device based on said reproduction environment information.

7. The multimedia communication system according to claim 6, wherein:
 said multimedia communication device transmits said content data that were read to a termination-side terminal that is the terminal that is the communication partner of said terminal that performs call origination; and
 said termination-side terminal reproduces content data that were transmitted from said multimedia communication device.

8. The multimedia communication system according to claim 7, wherein said multimedia communication device, after said termination-side terminal responds, transmits to said termination-side terminal data that were transmitted from an origination-side terminal that is said terminal that performs call origination.

9. The multimedia communication system according to claim 6, wherein SIP is used for said call process signals.

* * * * *